(12) United States Patent
Chiang et al.

(10) Patent No.: US 10,762,494 B2
(45) Date of Patent: Sep. 1, 2020

(54) SYMMETRIC DISCOVERY OVER AUDIO

(71) Applicant: GOOGLE LLC, Mountain View, CA (US)

(72) Inventors: Edward Chiang, Tanjong Pagar (SG); Arjita Madan, Hyderabad (IN); Gopi Krishna Madabhushi, Hyderabad (IN); Heman Khanna, Hyderabad (IN); Rohan Laishram, Hyderabad (IN); Aviral Gupta, Hyderabad (IN)

(73) Assignee: Google LLC, Mountain View, CA (US)

(*) Notice: Subject to any disclaimer, the term of this patent is extended or adjusted under 35 U.S.C. 154(b) by 258 days.

(21) Appl. No.: 15/869,565

(22) Filed: Jan. 12, 2018

(65) Prior Publication Data

US 2018/0293571 A1    Oct. 11, 2018

Related U.S. Application Data

(60) Provisional application No. 62/483,804, filed on Apr. 10, 2017.

(51) Int. Cl.
*G06Q 20/32* (2012.01)
*G06F 3/16* (2006.01)
(Continued)

(52) U.S. Cl.
CPC ......... *G06Q 20/3272* (2013.01); *G06F 3/167* (2013.01); *G06Q 30/04* (2013.01);
(Continued)

(58) Field of Classification Search
CPC ...... G06Q 20/3272; H04W 4/80; G06F 3/167
(Continued)

(56) References Cited

U.S. PATENT DOCUMENTS

2004/0133789 A1    7/2004 Gantman et al.
2011/0258121 A1    10/2011 Kauniskangas et al.
(Continued)

FOREIGN PATENT DOCUMENTS

WO    2017029605 A1    2/2017
WO    2018/190927 A1    10/2018

OTHER PUBLICATIONS

Wittmann-Regis "International Preliminary Report on Patentability issued in International Application No. PCT/US2018/013534", dated Oct. 24, 2019, 8 pages.

(Continued)

*Primary Examiner* — Ayodeji O Ayotunde
(74) *Attorney, Agent, or Firm* — Dortiy & Manning, P.A.

(57) ABSTRACT

A first computing device broadcasts a first audio token comprising the first user computing device identifier over two or more audio frequency channels at specified intervals and listens for audio inputs via the two or more audio frequency channels at the specified intervals. The first computing device receives a second audio token generated by a second computing device and communicates the received second audio token to the one or more computing devices. The second computing device receives the first audio token generated by the first computing device and communicates the received first audio token to the one or more computing devices. The one or more computing devices receive the first and second audio tokens and pair the first computing device and the second computing device and facilitate a transfer of data between the first computing device and the second computing device.

20 Claims, 9 Drawing Sheets

(51) Int. Cl.
    *H04W 4/35*     (2018.01)
    *H04W 4/80*     (2018.01)
    *G06Q 30/06*    (2012.01)
    *G06Q 30/04*    (2012.01)
(52) U.S. Cl.
    CPC .............. *G06Q 30/06* (2013.01); *H04W 4/35* (2018.02); *H04W 4/80* (2018.02)
(58) Field of Classification Search
    USPC ....................................................... 455/41.2
    See application file for complete search history.

(56) References Cited

U.S. PATENT DOCUMENTS

| | | | | |
|---|---|---|---|---|
| 2013/0265857 A1* | 10/2013 | Foulds | .................... | H04W 4/21 367/199 |
| 2017/0030999 A1* | 2/2017 | Garner | .................... | G01S 5/18 |
| 2018/0247297 A1* | 8/2018 | Misek | .................... | G08B 3/10 |

OTHER PUBLICATIONS

Goodrich, et al., "Using Audio in Secure Device Pairing", International Journal of Security and Networks, vol. 4, Nos. 1/2, Feb. 2009, pp. 57-68.

Dahl, Pia,"International Search Report and Written Opinion issued in International Application No. PCT/US2018/013534", dated Apr. 9, 2018, 15 pages.

\* cited by examiner

SYMMETRIC DISCOVERY OVER AUDIO

CROSS-REFERENCE TO RELATED APPLICATIONS

This application claims priority to U.S. Provisional Patent Application No. 62/483,804 filed Apr. 10, 2017, and entitled "Systematic Discovery over Audio." The entire disclosure of the above-identified priority application is hereby fully incorporated herein by reference.

TECHNICAL FIELD

The technology disclosed herein relates to discovery and pairing computing devices, and particularly to pairing computing devices via audio communication channels.

BACKGROUND

There are various scenarios in which two computing devices discover each other to initiate an action. Users in the developing world need a convenient user experience to transmit data between user computing devices. In the developed world, the tap-and-pair gesture, enabled via near-field communication ("NFC") in computing devices makes transmission of data to or from computing devices seamless. In the developing world, however, many computing devices do not have NFC functionality, making them ineligible to benefit from this NFC tap-and-pair gesture. Many computing devices without NFC functionality comprise a speaker component and microphone component that allow for output and input of sound communication. Current technology, however, does not provide for devices to discover each other by broadcasting and receiving data over an audio channel. One particular challenge of discovery via audio communication channels between two devices is that audio communication from a first device may interfere with audio communication from a second device if both devices are communicating over the same frequency at the same time.

Current applications for discovery of computing devices over a network do not provide for discovery via transmitting data over audio communication channels between the computing devices.

SUMMARY

The examples described herein provide computer-implemented techniques for pairing a first computing device with a second computing device using audio communication channels.

In an example, a system to pair computing devices using audio communication channels comprises a first computing device comprising a first processor communicatively coupled to a first storage device, wherein the first processor executes application code instructions that are stored in the first storage device to cause the first computing device to: receive a first input indicating a request to transfer data; generate a request identifier and request details; transmit a first computing device identifier, the request identifier, and the request details to one or more computing devices; broadcast a first audio token comprising the first user computing device identifier over two or more audio frequency channels at specified intervals; listen for audio inputs via the two or more audio frequency channels at the specified intervals; receive a second audio token generated by a second computing device; and communicate the received second audio token to the one or more computing devices.

The system further comprises the second computing device comprising a second processor communicatively coupled to a second storage device wherein the second processor executes application code instructions that are stored in the second storage device to cause the second computing device to: receive a second input indicating a request to receive the data; broadcast the second audio token comprising a second computing device identifier over at least two audio frequency channels at predetermined intervals; listen for audio inputs via the at least two audio frequency channels at the predetermined intervals; receive the first audio token from the first computing device; and communicate the received first audio token to the one or more computing devices.

Listening for at least one of the first audio token and the second audio token may for example comprise activating a microphone component for at least 5 seconds every 20, 25, 30 or 40 seconds. In an exemplary embodiment, listening for at least one of the first audio token and the second audio token comprises activating a microphone component every 30 seconds for 10 seconds.

In an example, at least one of the first computing device and the second computing device is caused to simultaneously transmit and listen for audio tokens.

In an example, in response to receiving the second audio token from the second computing device, the first processor executes application code instructions that are stored in the first storage device to cause the first computing device to broadcast the second audio token over multiple available frequencies within multiple available frequency channels. Such could increase the speed at which the second computing device receives the first audio token broadcast by the first computing device.

In an example, in response to receiving the second audio token from the second computing device, the first processor executes application code instructions that are stored in the first storage device to cause the first computer device to increase the interval for listening for audio inputs. Such could (also) increase the speed at which the second computing device receives the first audio token broadcast by the first computing device.

In an example, the system further comprises one or more computing devices comprising a third processor communicatively coupled to a third storage device, wherein the third processor executes application code instructions that are stored in the third storage device to cause the one or more computing devices to: identify the first computing device, the second computing device, the data request identifier, and the data request details based on the received first and second audio tokens; and receive the data transferred from the first computing device. In an example embodiment, the third processor may be further configured to execute application code instructions that are stored in the third storage device to cause the one or more computing devices to transfer the data in accordance with the data request details to the second computing device.

The first user registers with a service processing system, downloads and installs a service application on a first computing device associated with the first user, and enters service account information or other data into a first user account using the service application operating on the first user computing device. The second user registers with the service processing system, downloads a service application on a second computing device associated with the second user, and enters service account information or other data into a second user account using the service application operating on the second computing device. Either the first user operating the first computing device or the second user operating the second computing device initiates a data transfer or service request. The first computing device and second computing device are paired over a network after exchanging audio tokens via audio communication channels, and the data transfer or the service request is processed by the service processing system, which pairs the devices and receives data from one or both of the first computing device and the second computing device.

DETAILED DESCRIPTION OF EXAMPLE EMBODIMENTS

Overview

Figure 1:
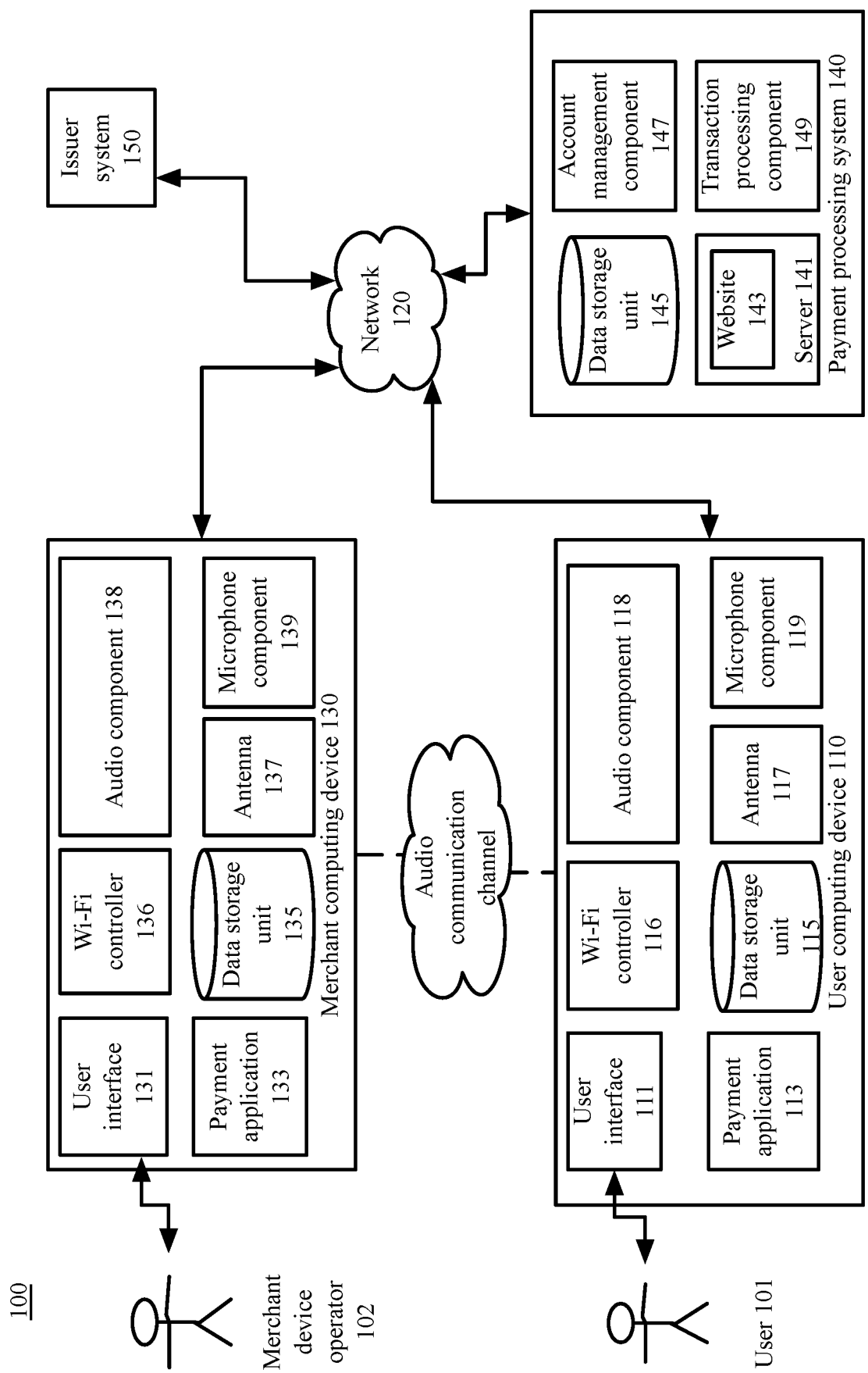
FIG. 1 is a block diagram depicting a system for pairing a user computing device with a merchant computing device via audio communication channels, in accordance with certain examples.

The examples described herein provide computer-implemented techniques for pairing a first computing device with a second computing device via audio communication channels. The examples described herein further provide computer-implemented techniques for pairing a user computing device with a merchant computing device via audio communication channels.

A first user registers with a payment processing computing system, downloads and installs a payment application on the first computing device, and enters payment account information or other data into a first user account using the payment application. The second user registers with the payment processing computing system, downloads a payment application on the second computing device, and enters payment account information or other data into a second user account using the payment application.

Either the first user operating the first computing device or the second user operating the second computing device initiates a payment transaction and the first computing device and second computing device are paired over a network after exchanging audio tokens via audio communication channels. The payment transaction is processed by the payment processing computing system, which pairs the devices and receives data from one or both of the devices. In other examples, the first user or the second user initiates a request to share, send, and/or receive data between the first computing device and the second computing device. The first computing device and second computing device are paired over the network after exchanging information via audio communication channels and share the requested data over the network. For example, the first user desires to share or receive data comprising files, images, or text with the second user. The first user initiates a data transfer via the payment application of the first computing device. The second computing device initiates the data transfer via the payment application of the second computing device. The first user computing device and the second computing device exchange audio tokens via audio communication channels. The devices are paired over the network based on the exchanged information and enabled to share, send, and/or receive data over the network.

In an example, the first user of the first computing device selects the payment application on the first computing device to initiate a transaction. In an example, in response to the selection of the payment application, the first computing device generates a first transaction identifier and transmits the first transaction identifier and first transaction details to a payment processing computing system over a network. In response to the selection of the payment application, the first computing device broadcasts a first audio token. In an example, the first audio token is broadcast via ultrasound communication. In another example, the first audio token is broadcast via audible sound communication. In an example, in response to or concurrently with broadcasting the first audio token, the first computing device activates an microphone component to listen for audio tokens transmitted by computing devices within audio communication range of the first computing device.

At a time prior to, at the same time as, or at a time after the first user selects the payment application on the first computing device, the second user selects an option on the second computing device to initiate a transaction. In an example, in response to the selection of the payment application, the second computing device generates a second transaction identifier and transmits the second transaction identifier and second transaction details to the payment processing computing system over the network. In other examples, the second computing device does not transmit a transaction identifier or transmit any data to the payment processing computing system in response to receiving the selection of the payment application. In an example, the second computing device broadcasts an audio token in response to receiving the input via the second computing device. In an example, the second audio token is broadcast via ultrasound communication. In another example, the second audio token is broadcast via an audible sound communication. In an example, in response to or concurrently with broadcasting the second audio token, the second computing device activates an microphone component to listen for audio tokens transmitted by computing devices within audio communication range of the second computing device.

In examples, broadcasting audio tokens comprises broadcasting via two or more frequency channels, at predetermined intervals, and/or at two or more frequencies within each frequency channel. In another example, broadcasting audio tokens comprises broadcasting via two or more frequency channels, at random intervals, and/or at two or more frequencies within each frequency channel. A frequency channel could, for example, be used for broadcasting in the range of 20-30 MHz. Two or more frequency channels could, for example, differ in the frequency domain in which signals are broadcasted. For example, a first frequency channel could cover a frequency range of 10-15 MHz, whereas a second frequency channel could cover a frequency range of 20-25 MHz. In an example, the audio tokens comprise a device identifier associated with the respective computing device (first or second) that transmitted the audio token and comprise a transaction identifier. The first computing device or second computing device receives the audio token broadcast by the second computing device or first computing device, respectively, comprising the transaction identifier and the device identifier of the second computing device or first computing device, respectively.

In an example, both the first computing device and the second computing device listen for audio tokens from other computing devices via the two or more frequency channels, at predetermined or random intervals, and at the two or more frequencies within each frequency channel. In this example, both a microphone component and a speaker component of both the first computing device and the second computing device are activated to simultaneously transmit and listen for audio tokens. In an example, the first computing device receives a particular audio token from the second computing device via the speaker component of the first computing device. In this example, in response to receiving the particular audio token, the first computing device broadcasts an audio token over multiple available frequencies within multiple available frequency channels to increase the speed at which the second computing device receives the audio token broadcast by the first computing device. In an example, the first computing device and the second computing device retransmit the received audio tokens to the payment processing computing system via the network. In an example, in response to receiving the audio token, the first computing device broadcasts the received audio token over multiple available frequencies within multiple available frequency channels to increase the speed at which the second computing device receives the audio token broadcast by the first computing device.

In an example, the payment processing computing system receives audio tokens from both the first computing device and the second computing device and pairs the first and second computing device based on information received in the first and second audio tokens. In this example, based on determining a match or correspondence of information between the first and second audio tokens, the payment processing computing system facilitates communication between the first computing device and the second computing device over a network to allow transmission of payment account data and/or relevant transaction information to the payment processing computing system to enable the payment processing computing system to process a transaction.

By using and relying on the methods and systems described herein, the first computing device, the second computing device, and the payment processing computing system provide the capability to pair via audio communication channels without the necessity of using near field communication ("NFC") or other limited range communication methods. Further, the first computing device, the second computing device, the payment processing computing system, and the issuer system enable the user to conduct a transaction at the merchant computing device by pairing the user computing device to the merchant computing device via audio communication channels. As such, the systems and methods described herein enables pairing via audio communication channels of computing devices not comprising conventional NFC functionality or in an environment in which NFC is unavailable. Further, the systems and methods described herein enables pairing via audio communication channels of computing devices comprising conventional NFC functionality at longer distances than available via NFC pairing. For example, NFC pairing is limited to a distance between devices of 20 centimeters. Also, the systems and methods described herein enable pairing via audio such that the first computing device and second computing device simultaneously communicate audio tokens to each other without interference by utilizing two or more frequency channels and transmitting audio tokens at intervals.

Example System Architecture

Turning now to the drawings, in which like numerals indicate like (but not necessarily identical) elements throughout the figures, examples are described in detail.

FIG. 1 is a block diagram depicting a system 100 for pairing a user computing device 110 with a merchant computing device 130 via audio communication channels to conduct a transaction, in accordance with certain examples. As depicted in FIG. 1, the system 100 comprises network computing devices 110, 130, 140, and 150 that are configured to communicate with one another via one or more networks 120. In some embodiments, a user associated with a device must install an application and/or make a feature selection to obtain the benefits of the techniques described herein.

In examples, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy ("BLE"), near field communication ("NFC"), ultrasound communication, or any combination thereof or any other appropriate architecture or system that facilitates the communication of signals, data, and/or messages. Throughout the discussion of examples, it should be understood that the terms "data" and "information" are used interchangeably herein to refer to text, images, audio, video, or any other form of information that can exist in a computer-based environment.

Each network computing device 110, 130, 140, and 150 includes a device having a communication module capable of transmitting and receiving data over the network 120. For example, each network computing device 110, 130, 140, and 150 can include a server, desktop computer, laptop computer, tablet computer, a television with one or more processors embedded therein and/or coupled thereto, smart phone, handheld computer, personal digital assistant ("PDA"), video game device, wearable computing device, or any other wired or wireless, processor-driven device. In the example depicted in FIG. 1, the network computing devices 110, 130, 140, and 150 are operated by users 101, merchant computing device operators 102, payment processing computing system 140 operators, and issuer system 150 operators, respectively.

In certain embodiments, two computing devices comprising a user computing device 110 and a merchant computing device 130 are paired via an audio communication channel. In other examples, a first user computing device 110 and a second user computing device 110 are paired via an audio communication channel. In other examples, one or more functions described herein as being performed by the user computing device 110 is performed by a first user computing device 110 and one or more functions described herein as being performed by the merchant computing device 130 may also be performed by a second user computing device 110. In other examples, one or more functions described herein as being performed by a first computing device 110 is performed by a second computing device 110 and one or more functions herein described as being performed by the second computing device 110 may also be performed by the first computing device 110. In other examples, one or more functions described herein as being performed by the user computing device 110 is performed by the merchant computing device 130 and one or more functions described herein as being performed by the merchant computing device 130 is performed by the user computing device 110.

An example user computing device 110, or first user computing device, comprises a user interface 111, a payment application 113, a data storage unit 115, a Wi-Fi controller 116, an antenna 117, an audio component 118, and a microphone component 119. The user computing device 110 communicates with a payment processing computing system 140 via the network 120 and with the merchant computing device 130 via an audio communication channel.

An example user interface 111 enables the user 101 to interact with the user computing device 110. For example, the user interface 111 comprises a touch screen, a voice-based interface, or any other interface that allows the user 101 to provide input and receive output from an application on the user computing device 110. In an example, the user 101 interacts via the user interface 111 with the payment application 113.

An example web browser 112, or communication application, enables the user 101 of the user computing device 110 to view, download, upload, or otherwise access documents or web pages via a distributed network 120. For example, the web browser 112 may enable communication over the network 120 with the payment processing computing system website 143.

An example payment application 113 is a program, function, routine, applet, or similar entity that exists on and performs its operations on the user computing device 110. In certain examples, the user 101 must install the payment application 113 and/or make a feature selection on the user computing device 110 to obtain the benefits of the techniques described herein. In an example, the user 101 accesses the payment application 113 on the user computing device 110 via the user interface 111. In an example, the payment application 113 is associated with the payment processing computing system 140.

An example data storage unit 115 comprises a local or remote data storage structure accessible to the user computing device 110 suitable for storing information. In an example, the data storage unit 115 stores encrypted information, such as HTML5 local storage.

An example Wi-Fi controller 116 is capable of sending and receiving data, performing authentication and ciphering functions, and directing how the user computing device 110 will listen for transmissions from the merchant computing device 130 or configuring the user computing device 110 into various power-save modes according to Wi-Fi-specified procedures. In another example, the user computing device 110 comprises a Bluetooth controller or Bluetooth low energy ("BLE") controller, or an NFC controller capable of performing similar functions. An example Wi-Fi controller 116 communicates with the payment application 113 and is capable of sending and receiving data over a wireless, Wi-Fi communication channel. In another example, a Bluetooth controller, BLE controller, or NFC controller performs similar functions as the Wi-Fi controller 116 using Bluetooth, BLE, or NFC protocols. In an example, the Wi-Fi controller 116 activates the antenna 117 to create a wireless communication channel between the user computing device 110 and the merchant computing device 130. For example, the user computing device 110 communicates with the merchant computing device 130 via the antenna 117. In an example, when the user computing device 110 has been activated, the Wi-Fi controller 116 polls through the antenna 117 a radio signal, or listens for radio signals from the merchant computing device 130.

An example antenna 117 is a means of communication between the user computing device 110 and a merchant computing device 130. In an example, a Wi-Fi controller 116 outputs through the antenna 117 a radio signal, or listens for radio signals from the merchant computing device 130. In another example a Bluetooth controller or a near field communication ("NFC") controller is used.

An example audio component 118 comprises a speaker device or other device capable of producing an ultrasound output. In an example, the audio component 118 can communicate with the payment application 113 to receive an instruction to broadcast an ultrasound output. In an example, the audio component 118 is a component of the user computing device 110. In another example, the audio component 118 is communicatively coupled to the user computing device 110.

An example microphone component 119 comprises a microphone device that is capable of receiving ultrasound inputs and audible sound inputs from an environment of the user computing device 110. In an example, the microphone component 119 communicates with the payment application 113 to receive an instruction to transition from a passive mode to an active mode and listen for ultrasound inputs. In an example, the microphone component 119 receives ultrasound inputs while in the active mode and transmits the received ultrasound inputs to the payment application 113.

An example merchant computing device 130, or second user computing device, comprises a user interface 131, a payment application 133, a data storage unit 135, a Wi-Fi controller 136, an antenna 137, an audio component 138, and a microphone component 139. In an example, the merchant computing device 130 comprises a mobile computing device such as a smartphone device, tablet device, or other mobile computing device. In another example, the merchant computing device 130 comprises a point of sale terminal. The merchant computing device 130 communicates with a payment processing computing system 140 via the network 120 and with the user computing device 110 via an audio communication channel. In an example, the merchant computing device 130 communicates with an issuer system 150 via the network 120.

An example user interface 131 enables the merchant computing device operator 102 to interact with the merchant computing device 130. For example, the user interface 131 comprises a touch screen, a voice-based interface, or any other interface that allows the merchant computing device operator 102 to provide input and receive output from an application on the merchant computing device 130. In an example, the merchant computing device operator 102 interacts via the user interface 131 with the payment application 133.

An example web browser 132, or communication application, enables the operator 102 of the merchant computing device 130 to view, download, upload, or otherwise access documents or web pages via a distributed network 120. For example, the web browser 132 may enable communication over the network 120 with the payment processing computing system website 143.

An example payment application 133 is a program, function, routine, applet, or similar entity that exists on and performs its operations on the merchant computing device 130. In certain examples, the merchant computing device operator 102 must install the payment application 133 and/or make a feature selection on the merchant computing device 130 to obtain the benefits of the techniques described herein. In an example, the merchant computing device operator 102 accesses the payment application 133 on the merchant computing device 130 via the user interface 131. In an example, the payment application 133 is associated with the payment processing computing system 140.

An example data storage unit 135 comprises a local or remote data storage structure accessible to the merchant computing device 130 suitable for storing information. In an example, the data storage unit 135 stores encrypted information, such as HTML5 local storage.

An example Wi-Fi controller 136 is capable of sending and receiving data, performing authentication and ciphering functions, and directing how the merchant computing device 130 will listen for transmissions from the user computing device 110 or configuring the merchant computing device 130 into various power-save modes according to Wi-Fi-specified procedures. In another example, the merchant computing device 130 comprises a Bluetooth controller, Bluetooth low energy ("BLE") controller, or an NFC controller capable of performing similar functions. An example Wi-Fi controller 136 communicates with the payment application 133 and is capable of sending and receiving data over a wireless, Wi-Fi communication channel. In another example, a Bluetooth controller, BLE controller, or NFC controller performs similar functions as the Wi-Fi controller 136 using Bluetooth, BLE, or NFC protocols. In an example, the Wi-Fi controller 136 activates the antenna 137 to create a wireless communication channel between the merchant computing device 130 and the user computing device 110. For example, the merchant computing device 130 communicates with the user computing device 110 via the antenna 137. In an example, when the merchant computing device 130 has been activated, the Wi-Fi controller 136 polls through the antenna 137 a radio signal, or listens for radio signals from the merchant computing device 130.

An example antenna 137 is a means of communication between the merchant computing device 130 and the user computing device 110. In an example, a Wi-Fi controller 136 outputs through the antenna 137 a radio signal, or listens for radio signals from the user computing device 110. In another example a Bluetooth controller or a near field communication ("NFC") controller is used.

An example audio component 138 comprises a speaker device or other device capable of producing an ultrasound output. In an example, the audio component 138 can communicate with the payment application 133 to receive an instruction to broadcast an ultrasound output. In an example, the audio component 138 is a component of the merchant computing device 130. In another example, the audio component 138 is communicatively coupled to the merchant computing device 130.

An example microphone component 139 comprises a microphone device that is capable of receiving ultrasound inputs from an environment of the merchant computing device 130. In an example, the microphone component 139 communicates with the payment application 133 to receive an instruction to transition from a passive mode to an active mode and listen for ultrasound inputs. In an example, the microphone component 139 receives ultrasound inputs while in the active mode and transmits the received ultrasound inputs to the payment application 133.

An example payment processing computing system 140, or service processing system, comprises an account management component 141, a data storage unit 145, and a transaction processing component 149. In an example, the payment processing computing system communicates with the user computing device 110 and the merchant computing device 130 via the network 120. In an example, the payment processing computing system 140 communicates with an issuer system 150 via the network 120.

An example server 141 provides the content that the user 101 or merchant computing device operator 102 accesses through the web browser 118 on the user computing device 110 or web browser 138 of the merchant computing device 130, including but not limited to html documents, images, style sheets, and scripts. In an example, the web server 141 supports the website 143 of the payment processing computing system 140.

An example website 143 communicates with the web browser 118 or a payment application 113 resident on the user computing device 110 via the network 120. In another example, the website 143 communicates with the web browser 138 or a payment application 133 resident on the merchant computing device 130 via the network 120. In an example, the user 101 or merchant computing device operator 102 accesses the website 143 to download a payment application 113 and/or configure a user 101 or merchant system account with the payment processing computing system 140. An example data storage unit 145 comprises a local or remote data storage structure accessible to the payment processing computing system 140 suitable for storing information. In an example, the data storage unit 145 stores encrypted information, such as HTML5 local storage.

In an example, the account management component 147 manages user 101 accounts and merchant system accounts associated with users 101 and merchant systems, respectively. The account management component 147 receives requests to add, edit, delete, or otherwise modify payment account information for a user 101 account or a merchant system account and adds, edits, deletes, or otherwise modifies payment account information for the user 101 account or the merchant system account in accordance with the received instructions.

In an example, the transaction processing component 149 receives transaction details from a merchant computing device 130 and payment information associated with a user 101 payment account. In an example, the transaction processing component 149 transmits a payment authorization request to an issuer system 150 or other appropriate financial institution associated with the user 101 payment account information. An example payment authorization request comprises merchant system payment account information, user 101 payment account information, and a total amount of the transaction. In an example, after the issuer system 150 processes the payment authorization request, the transaction processing component 149 receives an approval or denial of the payment authorization request from the issuer system 150 over the network 120. In an example, the transaction processing component 149 transmits a receipt to the merchant computing device 130 and/or the user computing device 110 comprising a summary of the payment transaction.

In another example, the transaction processing component 149 receives a transaction identifier generated by the merchant computing device 130, a merchant computing device 130 identifier, and transaction details from the merchant computing device 130. For example, the transaction details comprise the total amount of the transaction. In an example, the transaction processing component identifies a merchant system account based on the merchant computing device 130 identifier and identifies a merchant system payment account associated with the merchant system account for use in the transaction. In an example, the transaction processing component 149 associates the received transaction details, transaction identifier and merchant system payment account information and stores the associated transaction details, transaction identifier, and merchant system payment account information in a data storage unit 145 or other memory accessible by the payment processing computing system 140. In this example, the transaction processing component 149 extracts the stored transaction details and merchant system payment account information associated with the transaction identifier. In an example, the transaction processing component 149 receives a user 101 payment account identifier based on a selection of the user 101 of the particular payment account via the user interface 111 of the user computing device 110. In this example, the transaction processing component 149 extracts the user 101 payment account information associated with the payment account identifier. In another example, the payment processing computing system 140 receives data from the user computing device 110 via the network 120 and transmits the data via the network 120 to the merchant computing device 130. In yet another example, the payment processing computing system 140 receives data from the merchant computing device 130 via the network 120 and transmits the data via the network 120 to the user computing device 110.

An example issuer system 150 approves or denies a payment authorization request received from the merchant computing system 130 or from the payment processing computing system 140. In an example, the issuer system 150 communicates with the merchant computing device 130 and/or payment processing computing system 140 over the network 120. In an example, the issuer system 130 communicates with an acquirer system to approve a credit authorization and to make payment to the payment processing computing system 140 and/or merchant system. For example, the acquirer system is a third party payment processing company.

Figure 9:
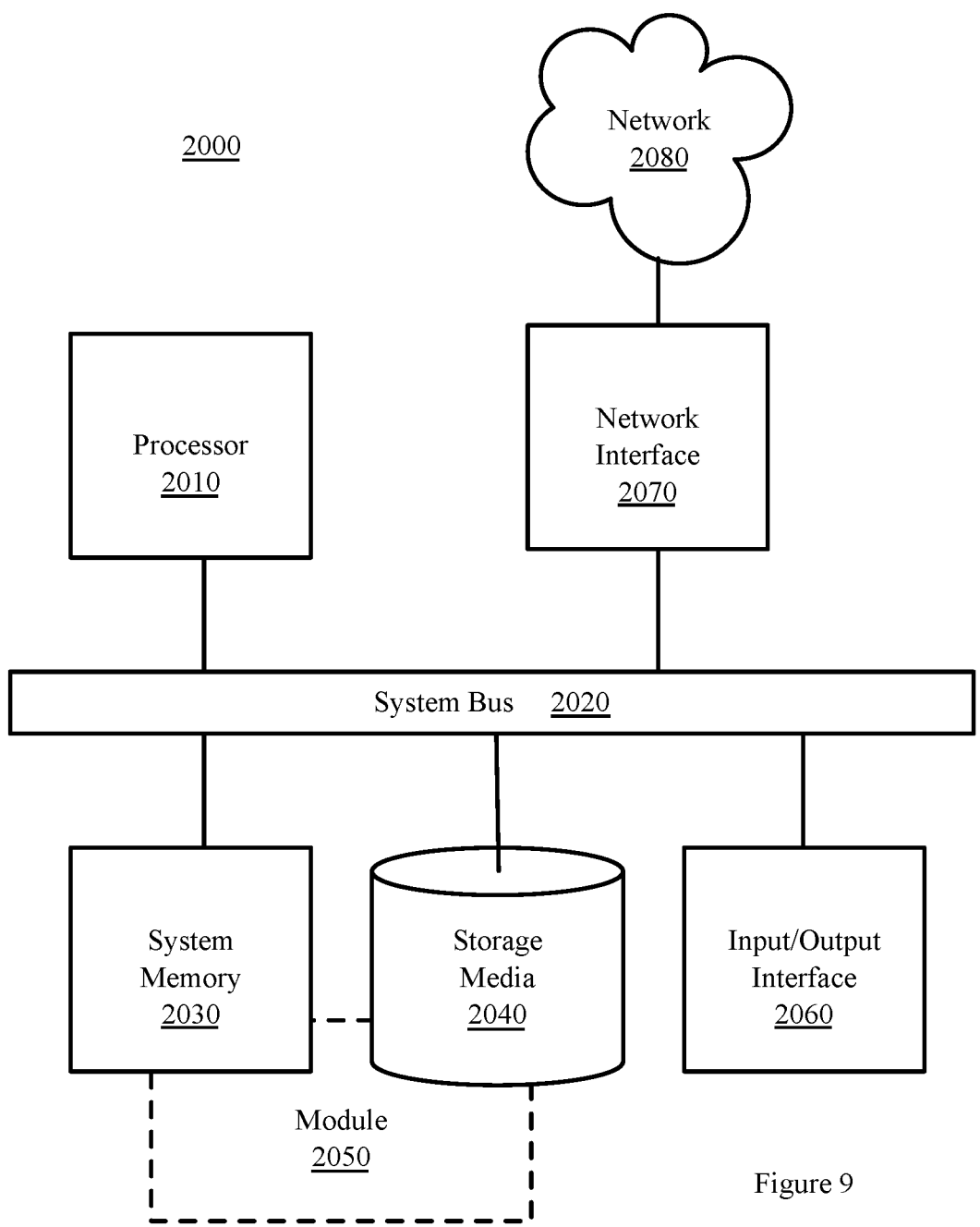
FIG. 9 is a block diagram depicting a computing machine and module, in accordance with certain examples.

In examples, the network computing devices and any other computing machines associated with the technology presented herein may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 2. The computing machines discussed herein may communicate with one another, as well as with other computing machines or communication systems over one or more networks, such as network 120. The network 120 may include any type of data or communications network, including any of the network technology discussed with respect to FIG. 9.

Example Processes

The example methods illustrated in FIGS. 2-8 are described hereinafter with respect to the components of the example operating environment 100. The example methods of FIGS. 2-8 may also be performed with other systems and in other environments. The operations described with respect to any of the FIGS. 2-8 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 2:
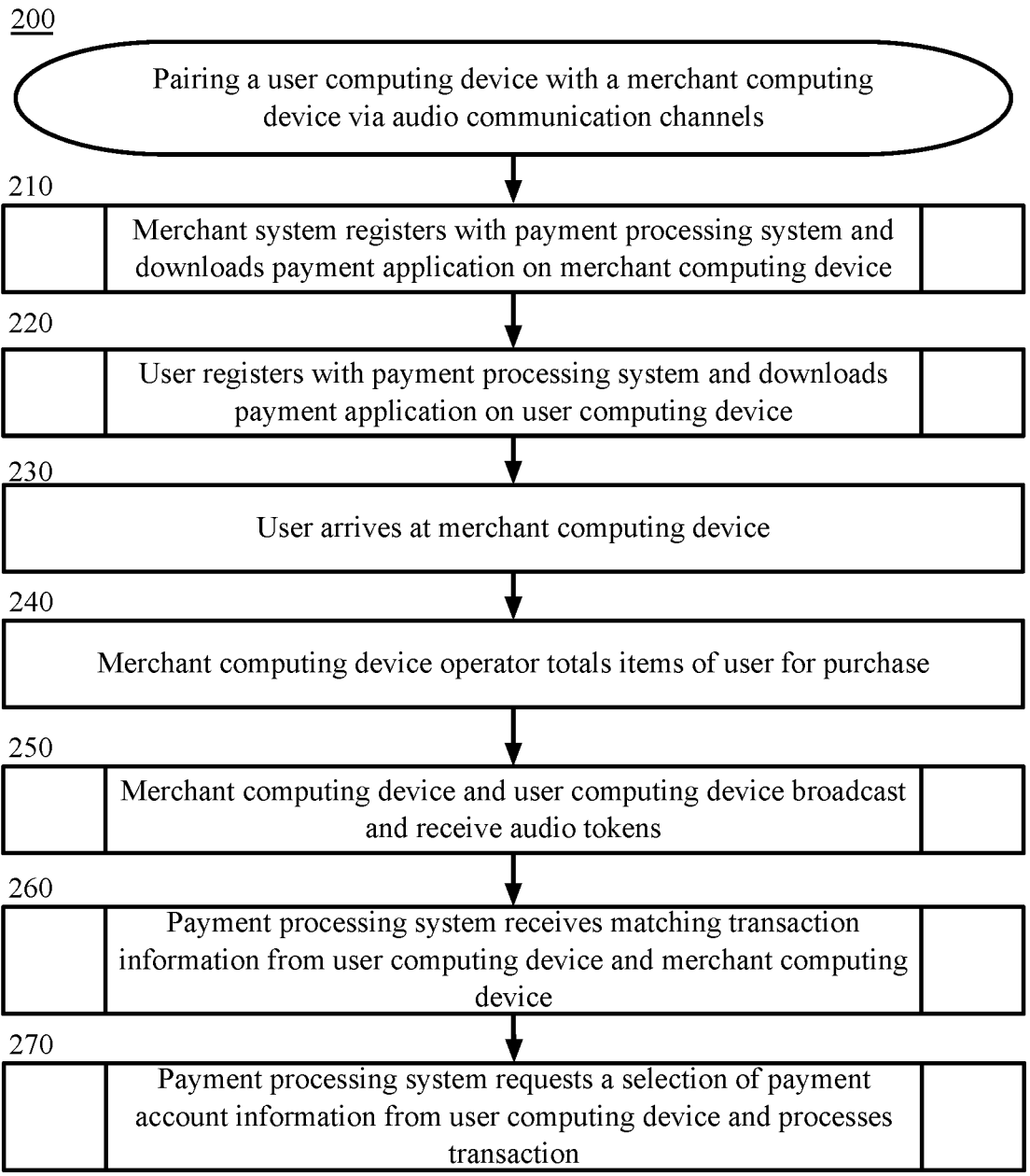
FIG. 2 is a block flow diagram depicting a method for pairing a user computing device with a merchant computing device via audio communication channels, in accordance with certain examples.

FIG. 2 is a block diagram depicting a method 200 for pairing a user computing device 110 with a merchant computing device 130 via audio communication channels, in accordance with certain examples. The method 200 is described with reference to the components illustrated in FIG. 1.

In block 210, a merchant system registers with the payment processing computing system 140. The method for registering, by a merchant system 130, for an account with a payment processing computing system 140 is described in more detail hereinafter with reference to the method described in FIG. 3.

Figure 3:
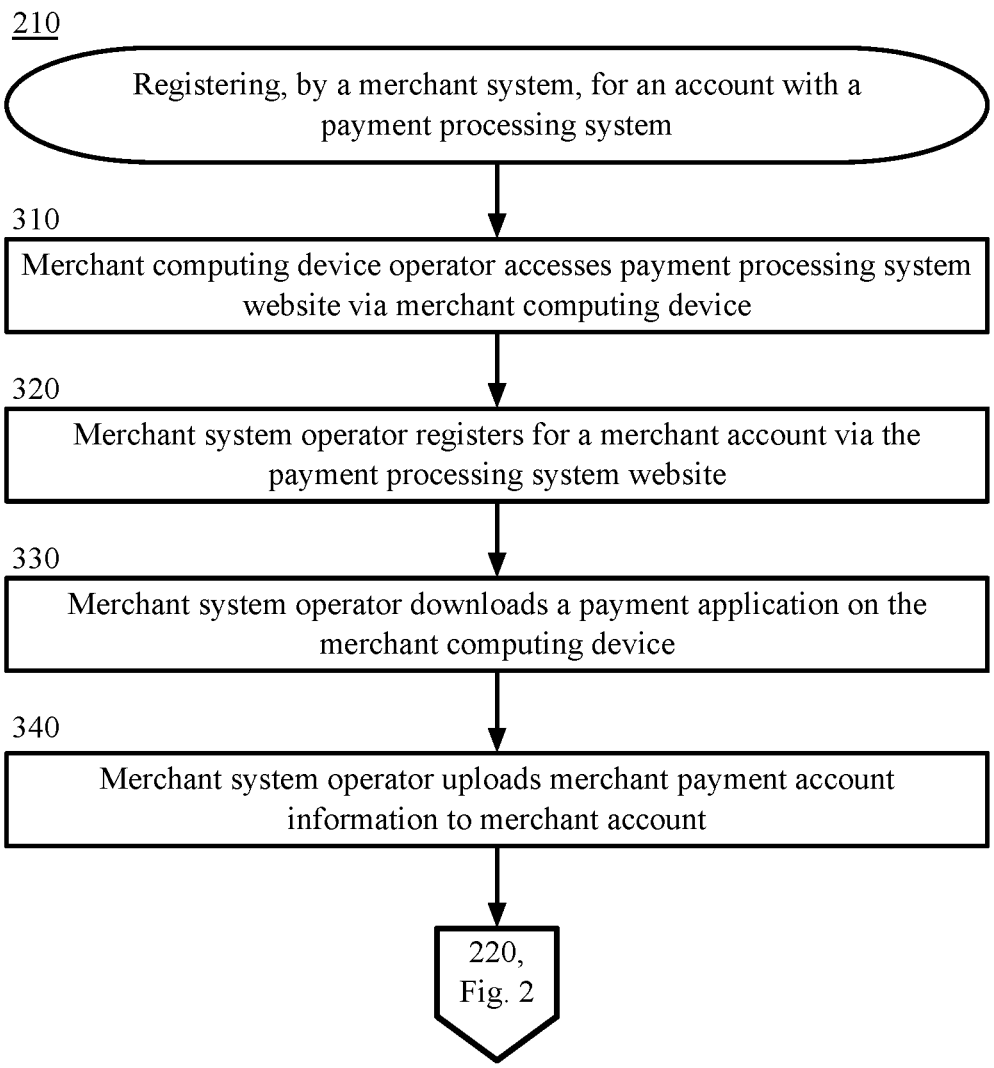
FIG. 3 is a block flow diagram depicting a method for registering, by a merchant system, for an account with a payment processing computing system, in accordance with certain examples.

FIG. 3 is a block diagram depicting a method 210 for registering, by a user 101, for an account with a payment processing computing system 140, in accordance with certain examples. The method 210 is described with reference to the components illustrated in FIG. 1.

In block 310, the merchant computing device operator 102 accesses the payment processing computing system website 143 via the merchant computing device 130. In an example, the merchant computing device operator 102 selects a web browser via the user interface 131 of the merchant computing device 130 and enters the payment processing computing system website 143 address into the web browser or otherwise accesses the payment processing computing system website 143 via the merchant computing device 130.

In block 320, a merchant computing device operator 102 registers for a merchant account via the payment processing computing system website 143. In an example, the merchant computing device operator 102 accesses a payment processing computing system 140 website 143 and registers for a merchant account with the payment processing computing system 140 via the website 143. In an example, the merchant computing device operator 102 adds payment account information to the merchant account managed by the payment processing computing system 140 via the website 143. In an example, the payment processing computing system website 143 is able to communicate with one or more user computing devices 110, the merchant computing device 130, one or more issuer systems 150, and one or more acquirer systems over a network 120. In an example, the payment processing computing system website 143 communicates with the merchant computing device 130 over the network 120.

In block 330, the merchant computing device operator 102 downloads a payment application 133 on the merchant computing device 130. In another example, the merchant computing device operator 102 purchases a merchant computing device 130 from the payment processing computing system 140 with the payment application 133 pre-installed on the merchant computing device 130. In an example, the merchant computing device 130 is able to communicate with the payment processing computing system 140 over a network 120. In an example, the merchant computing device 130 communicates with the payment processing computing system 140 via the network 120. For example, the merchant computing device 130 may be able to transmit transaction details to the payment processing computing system 140 via the payment application 133 over the network 120 to enable the payment processing computing system 140 to process a payment transaction. In another example, the merchant computing device 130 may be able to receive a receipt from the payment processing computing system 140 that notifies the merchant computing device 130 as to whether a transaction was successful or not successful.

In an example, a merchant computing device operator 102 installs a payment application 133 on the merchant computing device 130 or purchases/obtains a merchant computing device 130 from the payment processing computing system 140 with the payment application 133 pre-installed on the merchant computing device 130. In an example, the merchant computing device 130 is able to communicate with one or more user computing devices 110, the payment processing computing system 140, one or more issuer systems 150, and one or more acquirer systems over a network 120. In an example, the merchant computing device 130 communicates with the payment processing computing system 140 via the payment application 133 of the merchant computing device 130 over the network 120. In certain examples, the merchant computing device 130 can transmit transaction details and a merchant computing device 130 identifier to the payment processing computing system 140 via the payment application 133 over the network 120 to enable the payment processing computing system 140 to process a transaction. In an example, the merchant computing device 130 is able to receive receipts from the payment processing computing system 140 that notify a merchant computing device 130 operator 102 as to whether a transaction was successful or not. In an example, the merchant computing device 130 comprises a mobile computing device, for example, a mobile phone device, a tablet device, or a laptop computing device.

In block 340, the merchant computing device operator 102 uploads merchant payment account information to the merchant account. In an example, the merchant system adds payment account information associated with a merchant system payment account to the merchant account managed by the payment processing computing system 140. For example, the payment account information comprises an account number, an expiration date, an address, a merchant account holder name, or other information associated with the merchant system payment account that would enable the payment processing computing system 140 to process a payment transaction.

From block 340, the method 210 proceeds to block 220 in FIG. 2.

Returning to FIG. 2, in block 220, the user 101 registers with the payment processing computing system 140 and downloads the payment application 113 on the user computing device 110. The method 220 for registering, by the user 101, for an account with the payment processing computing system 140 is described in more detail hereinafter with reference to the method described in FIG. 4.

Figure 4:
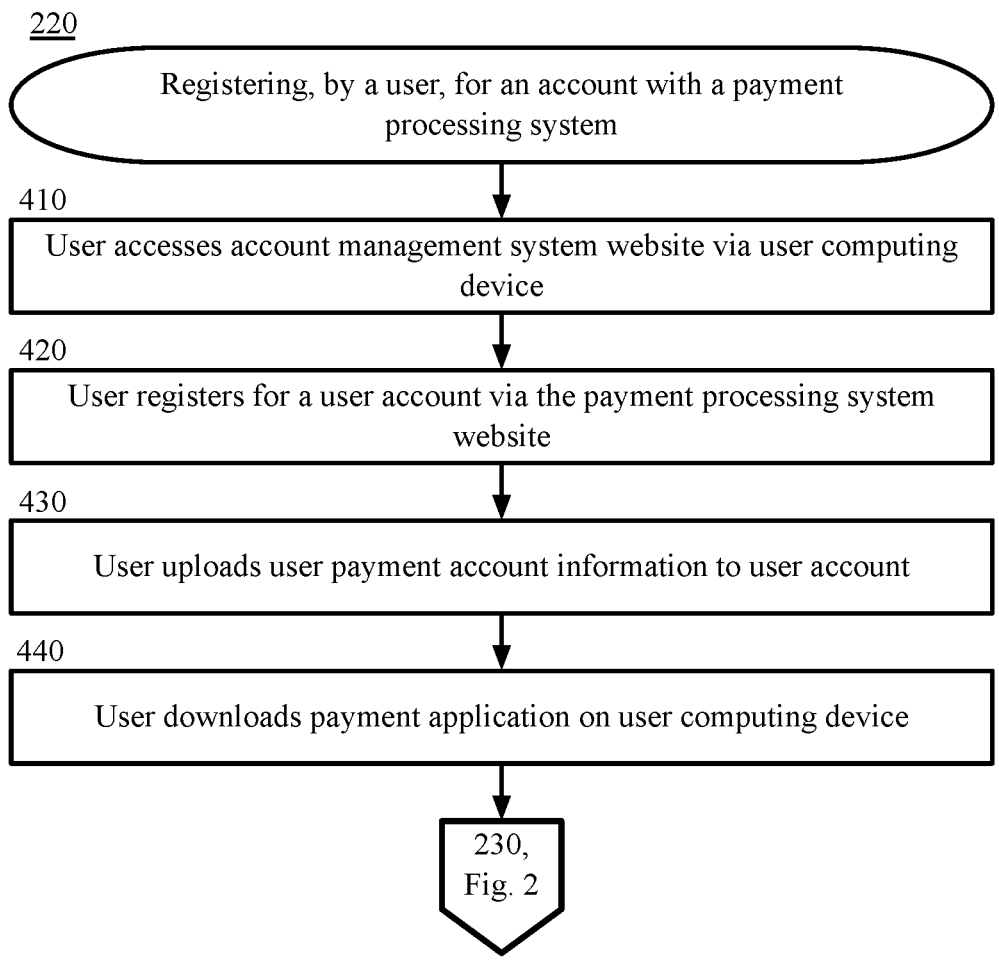
FIG. 4 is a block flow diagram depicting a method for registering, by a user, for an account with a payment processing computing system, in accordance with certain examples.

FIG. 4 is a block diagram depicting a method 220 for registering, by a user 101, for an account with a payment processing computing system 140, in accordance with certain examples. The method 220 is described with reference to the components illustrated in FIG. 1.

In block 410, the user 101 accesses the payment processing computing system website 143 via the user computing device 110. In an example, the user 101 enters the website 143 address into a web browser or otherwise accesses the website 143 via the user interface 111 of the user computing device 110. In an example, the user 101 actuates a user interface 111 object on an advertisement on the web browser and the web browser redirects to the website 143.

In block 420, the user 101 registers for a user 101 account via the payment processing computing system website 143. The user 101 may obtain a user 101 account number, receive the appropriate applications and software to install on the user computing device 110, request authorization to participate transaction processing, or perform any action required by the payment processing computing system 140. The user 101 may utilize the functions of the user computing device 110, such as the user interface 111 and a web browser, to register and configure a user 101 account. In an example, the user 101 may enter payment account information associated with one or more user 101 accounts, for example, one or more credit accounts, one or more bank accounts, one or more stored value accounts, and/or other appropriate accounts into the user 101 account maintained by the payment processing computing system 140.

In block 430, the user 101 uploads or enters user 101 payment account information to the user 101 account. In an example, the user 101 may configure user 101 account settings or add, delete, or edit payment account information via the payment processing computing system website 143. In an example, the user 101 may select an option to enable or disable the permission of the payment processing computing system 140 to process transactions. For example, the payment account information comprises an account number, an expiration date, an address, a user 101 account holder name, or other information associated with the user 101 payment account that would enable the payment processing computing system 140 to process a payment transaction.

In block 440, the user 101 downloads the payment application 113 on the user computing device 110. In an example, the user 101 selects an option on the payment processing computing system 140 website 143 to download a payment application 113 onto the user computing device 110. In an example, the payment application 113 operating on the user computing device 110 is able to communicate with the payment processing computing system 140 over the network 120. In an example, the payment application 113 operating on the user computing device 110 is able to communicate with the payment processing computing system 140 over the network 120 when the user 101 is signed in to the payment application 113.

From block 440, the method 220 proceeds to block 230 in FIG. 2.

Returning to FIG. 2, in block 230, the user 101 arrives at the merchant computing device 130. In an example, the user 101 signs into the payment application 113 on the user computing device 110 before entering the merchant location. In another example, the user 101 signs in to the payment application 113 at the same time or after the user 101 enters the merchant location. In an example, to sign in to the payment application 113, the user 101 may enter a username and password associated with the user's 101 payment processing computing system 140 account and select an object on the user interface 111 of the user computing device 110 that reads "sign in." In this example, the payment application 113 communicates the username and password to the payment processing computing system 140 via the network 120. In this example, the payment processing computing system 140 validates the username and password for the user 101 account. In this example, if the username and password are correct, the payment processing computing system 140 establishes communication with the payment application 113 on the user computing device 110 via the network 120.

In block 240, the merchant computing device operator 102 totals items of the user 101 for purchase. For example, the user 101 approaches the merchant computing device 130. In an example, at a time prior to approaching the merchant computing device 130, the user 101 browses the merchant location and selects one or more items to purchase. In this example, the user 101 may collect the one or more items and carry, or otherwise transport via physical basket or shopping cart, the one or more items to the merchant computing device 130. For example, the merchant computing device 130 operator 102 totals the items of the user 101 for purchase. In an example, the merchant computing device 130 operator 102 scans barcodes attached to the one or more items or otherwise enters descriptions and prices associated with the one or more items into the merchant computing device 130. In an example, after scanning or manually entering the items into the merchant computing device 130, the merchant computing device operator 102 actuates an object on the user interface 131 of the merchant computing device 130 via the payment application 133 to direct the merchant computing device 130 to total the items. In an example, the merchant computing device 130 displays, via the user interface 131, the total to the user 101 and the merchant computing device operator 102.

In block 250, the merchant computing device 130 and the user computing device 110 broadcast and receive audio tokens. The method for broadcasting and receiving audio tokens via a merchant computing device 130 and a user computing device 110 is described in more detail hereinafter with reference to the method described in FIG. 5.

Figure 5:
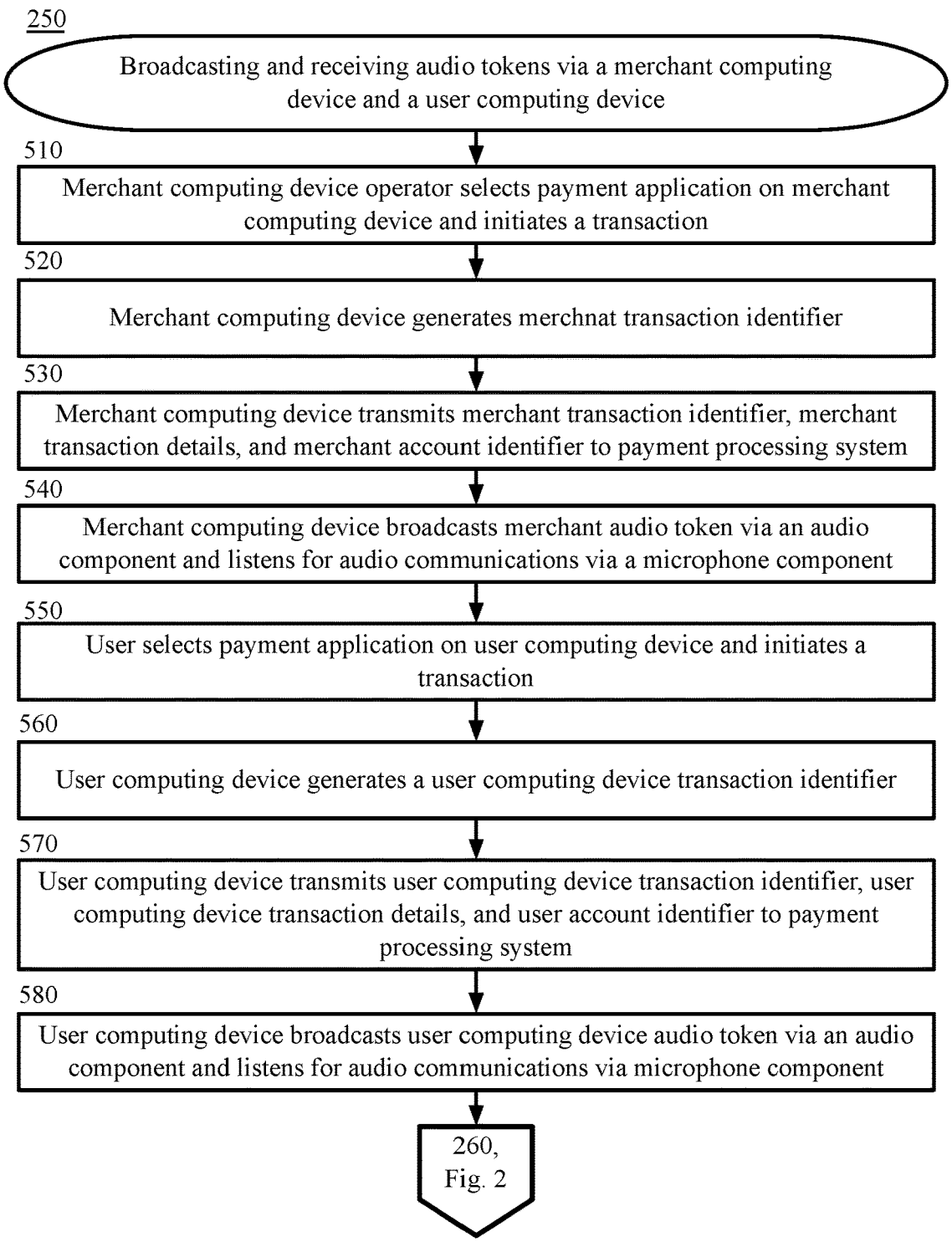
FIG. 5 is a block flow diagram depicting a method for initiating a transaction and broadcasting audio tokens via a merchant computing device and a user computing device, in accordance with certain examples.

FIG. 5 is a block diagram depicting a method 250 for broadcasting and receiving audio tokens via a merchant computing device 130 and a user computing device 110, in accordance with certain examples. The method 250 is described with reference to the components illustrated in FIG. 1.

In block 510, the merchant computing device operator 102 selects a payment application 133 on the merchant computing device 130 and initiates a transaction. For example, the user 101 directs the merchant computing device 130 operator 102 to initiate a transaction via the payment application 133. In an example, in response to receiving a verbal request from the user 101 to select the digital wallet application 133 as a payment option, the merchant computing device 130 operator actuates an object on the user interface 131 of the merchant computing device 130 corresponding to the payment application 133.

In an example, a confirmation screen may display information summarizing the potential transaction and comprising one or more of a transaction total, a description of the one or more items being purchased by the user 101, and a indication that the user 101 selected the payment application 113 as the method of payment for the transaction. An example confirmation screen may further display options to confirm the transaction or cancel the transaction. In an example, the user 101 reviews the confirmation screen, determines that the information displayed on the confirmation screen is correct, determines to continue with the transaction, and directs the merchant computing device 130 operator 102 to select the option to confirm the transaction via the user interface 131. In another example, the user 101 decides to abandon the transaction because the information is incorrect or because the user 101 changed his mind and decided not to purchase the items. In yet another example, the confirmation screen further comprises an option to edit the transaction details. In this example, the merchant computing device 130 operator 102, upon direction of the user 101, may select the option to edit the transaction details and may then edit, add, or delete one or more of the items in the transaction or edit payment details or payment methods for the transaction.

In block 520, the merchant computing device 130 generates a merchant transaction identifier. An example merchant transaction identifier comprises a string of alphanumeric and/or symbolic characters. In an example, the merchant computing device 130 generates the merchant transaction identifier using a random number generator. In certain examples, the merchant transaction identifier is transmitted to the payment processing computing system via the network 120 and also via an audio token to the user computing device 110, which retransmits the audio token comprising the merchant transaction identifier to the payment processing computing system, enabling the payment processing computing system to associate both the user computing device 110 and the merchant computing device 130 with the transaction identified by the merchant transaction identifier.

In block 530, the merchant computing device 130 transmits the merchant transaction identifier, merchant transaction details, and a merchant account identifier to the payment processing computing system 140. In an example, the merchant computing device 130 generates merchant transaction details. Example merchant transaction details comprise a total transaction amount, a description of one or more items being purchased in the transaction including prices associated with each of the one or more items, a merchant system identifier, a date and time of the transaction, a location or address associated with the merchant, or other transaction details. In an example, the merchant account identifier comprises an account number associated with a merchant payment account. In another example, the merchant computing device 130 transmits a request to the payment processing computing system 140 for a transaction identifier along with the transaction details and the merchant account identifier. In this example, the payment processing computing system 140 generates the merchant transaction identifier and associates the merchant transaction details and the merchant account identifier with the merchant transaction identifier. In this example, the payment processing computing system 140 transmits the merchant transaction identifier to the merchant computing device 130 via the network 120 and the merchant computing device 130 receives the merchant transaction identifier via the network 120.

In block 540, the merchant computing device 130 broadcasts a merchant audio token via the audio component 138 and listens for audio communications via the microphone component 139. In an example, in response to the merchant computing device operator 102 selecting the payment application 133 on the merchant computing device 130 and generating the merchant transaction identifier, the merchant computing device 130 generates and broadcasts the merchant audio token via an audio component 138 and listens for audio tokens via a microphone component 139. In an example, the payment application 133 generates the merchant audio token. An example audio token comprises the merchant transaction identifier and/or a merchant computing device identifier. In an example, the payment application 133 activates the audio component 138 of the merchant computing device 130 to broadcast the merchant audio token in an environment of the merchant computing device 130. For example, the payment application 133 transmits an instruction to the audio component 138 to activate the audio component 138 and transmit the merchant audio token. An example audio component 138 comprises a speaker device that is a component of the merchant computing device 130 or is otherwise communicatively coupled to the merchant computing device 130.

In an example, the merchant computing device 130 broadcasts the merchant audio token via the audio component 138 via an audible sound communication channel. In another example, the merchant computing device 130 broadcasts the merchant audio token over an ultrasound communication channel. In an example, the payment application 133 activates the microphone component 139 of the merchant computing device 130 to listen for audio communications in an environment of the merchant computing device 130. In an example, in response to receiving an input of the merchant computing device operator 102 selecting the payment application 133 on the merchant computing device 130, the payment application 133 activates the microphone component 139 of the merchant computing device 130 to listen for audio input in an environment of the merchant computing device 130. For example, the microphone component 139 listens for user computing device 110 audio tokens broadcast by user computing devices 110 in a proximity from the merchant computing device 130 over which communication via audible communication channels or via ultrasound communication channels may reliably occur.

In examples, the merchant computing device 130 broadcasts the merchant audio token via two or more frequency channels, at predetermined intervals, and/or at two or more frequencies within each frequency channel. An example predetermined interval comprises every fifteen seconds, every thirty seconds, every two minutes, or other appropriate interval. In another example, broadcasting the merchant audio token comprises broadcasting via two or more frequency channels, at random intervals, and/or at two or more frequencies within each frequency channel. In an example, the merchant audio token comprises a merchant computing device 130 identifier associated with the merchant computing device 130 and comprises a merchant transaction identifier.

In an example, the merchant computing device 130 listens for audio tokens from other computing devices via the two or more frequency channels, at predetermined or random intervals, and at the two or more frequencies within each frequency channel. In an example, the two or more frequency channels on which first computing device and the second computing device listen for audio tokens are either the same two or more frequency channels, have some channels in common, or are a different two or more frequency channels. In this example, both the microphone component 139 and the audio component 138 of the merchant computing device 130 are activated to simultaneously listen for and transmit audio tokens, respectfully. An example audio component 138 comprises a speaker device. In an example, the merchant computing device 130 receives a user computing device 110 audio token from the user computing device 110 via the microphone component 139 of the merchant computing device 130. In this example, in response to receiving the user computing device 110 audio token, the merchant computing device 130 broadcasts the merchant audio token over multiple available frequencies within multiple available frequency channels to increase the speed at which the user computing device 110 may receive the merchant audio token broadcast by the merchant computing device 130. In an example, the merchant computing device 130 and the user computing device 110 retransmit the received user computing device 110 audio token and received merchant audio token, respectively, to the payment processing computing system 140 via the network 120. For example, listening at predetermined intervals comprises activating, by the merchant computing device 130, the microphone component 139 of the merchant computing device 130 at predetermined intervals for a predetermined amount of time at each interval. For example, the microphone component 139 of the merchant computing device 130 is activated every 30 seconds for a duration of 10 seconds. In other examples, the microphone component 139 of the merchant computing device 130 is activated every 15 seconds for a duration of 5 seconds, or for another appropriate interval and duration. In this example, a microphone component 139 and an audio component 138 of the merchant computing device 130 and a microphone component 119 and an audio component 118 of the user computing device are activated to simultaneously transmit and listen for audio tokens. In an example, the merchant computing device 130 receives a user computing device 110 audio token from the user computing device 110 via the microphone component 139 of the merchant computing device 130. In this example, in response to receiving the user computing device 110 audio token, the merchant computing device 130 broadcasts the received user computing device 110 audio token over multiple available frequencies within multiple available frequency channels to increase the speed at which the user computing device 110 may receive the merchant audio token broadcast by the merchant computing device 130.

In another example, in response to receiving the user computing device 110 audio token, the merchant computing device 130 activated the speaker component of the merchant computing device 130 every 30 seconds for 10 seconds at a time and, in response to receiving the user computing device 110 audio token broadcasted by the user computing device 110, increases the interval of the audio component 138 to transmit the merchant audio token every 20 seconds for 10 seconds at a time to increase the speed at which the user computing device 110 may receive the merchant audio token broadcast by the merchant computing device 130.

In block 550, the user 101 selects the payment application 113 on the user computing device 110 and initiates a transaction. In an example, the user 101 selects the payment application 113 on the user computing device 110 at a time after, at a time before, or while the merchant computing device 130 broadcasts the merchant audio token. In an example, the user 101 actuates an object on the user interface 111 of the user computing device 110 corresponding to the payment application 113. In an example, a confirmation screen may display, via the user computing device 110, options to confirm the transaction or cancel the transaction. In an example, the user 101 reviews the confirmation screen and selects an option to confirm a transaction via the user interface 131. In another example, the user 101 decides to abandon the transaction.

In block 560, the user computing device 110 generates a user computing device 110 transaction identifier. An example user computing device 110 transaction identifier comprises a string of alphanumeric and/or symbolic characters. In an example, the user computing device 110 generates the user computing device 110 transaction identifier using a random number generator.

In block 570, the user computing device 110 transmits the user computing device 110 transaction identifier, user computing device 110 transaction details, and user 101 account identifier to the payment processing computing system 140. In certain examples, the user computing device 110 transaction identifier is transmitted to the payment processing computing system 140 via the network 120 and also via an audio token to the merchant computing device 130, which retransmits the audio token comprising the merchant transaction identifier to the payment processing computing system 140, enabling the payment processing computing system to associate both the user computing device 110 and the merchant computing device 130 with the transaction identified by the user computing device 110 transaction identifier. In an example, the user computing device 110 generates user computing device 110 transaction details. Example user computing device 110 transaction details comprise a user computing device 110 account identifier, a date and time of the transaction, a current or recent location logged by the user computing device 110, or other transaction details. In an example, the user computing device 110 account identifier comprises an account identifier associated with a user payment processing computing system account. In another example, the user computing device 110 transmits a request via the network 120 to the payment processing computing system 140 for a user computing device 110 transaction identifier along with the transaction details and the user computing device 110 account identifier. In this example, the payment processing computing system 140 generates the user computing device 110 transaction identifier and associates the user computing device 110 transaction details and the user computing device 110 account identifier with the user computing device 110 transaction identifier. In this example, the payment processing computing system 140 transmits the user computing device 110 transaction identifier to the user computing device 110 via the network 120 and the user computing device 120 receives the user computing device 110 transaction identifier via the network 120.

In examples, the user computing device 110 broadcasts the user computing device 110 audio token via two or more frequency channels, at predetermined intervals, and/or at two or more frequencies within each frequency channel. An example predetermined interval comprises every fifteen seconds, every thirty seconds, every two minutes, or other appropriate interval. In another example, broadcasting the user computing device 110 audio token comprises broadcasting via two or more frequency channels, at random intervals, and/or at two or more frequencies within each frequency channel. In an example, the user computing device 110 audio token comprise a user computing device 110 identifier associated with the user computing device 110 and comprises a user computing device 110 transaction identifier.

In an example, the user computing device 110 listens for audio tokens from other computing devices via the two or more frequency channels, at predetermined or random intervals, and at the two or more frequencies within each frequency channel. In an example, the two or more frequency channels on which user computing device 110 and the merchant computing device 130 listen for audio tokens are either the same two or more frequency channels, have some channels in common, or are a different two or more frequency channels. In this example, both the microphone component 119 and the audio component 118 of the user computing device 110 are activated to simultaneously transmit and listen for audio tokens, respectfully. An example audio component 118 comprises a speaker device. In an example, the user computing device 110 receives a merchant audio token from the merchant computing device 130 via the audio component 118 of the user computing device 110. In this example, in response to receiving the merchant audio token, the user computing device 110 broadcasts the user computing device 110 audio token over multiple available frequencies within multiple available frequency channels to increase the speed at which the merchant computing device 130 may receive the user computing device 110 audio token broadcast by the user computing device 110. In an example, the user computing device 110 and the merchant computing device 130 retransmit the received merchant audio token and received user computing device 110 audio token, respectively, to the payment processing computing system 140 via the network 120. For example, listening at predetermined intervals comprises activating, by the user computing device 110, the microphone component 119 of the user computing device 110 at predetermined intervals for a predetermined amount of time at each interval. For example, the microphone component 119 of the user computing device 110 is activated every 30 seconds for a duration of 10 seconds. In other examples, the microphone component 119 of the user computing device 110 is activated every 15 seconds for a duration of 5 seconds, or for another appropriate interval and duration. In this example, the microphone component 119 and the audio component 118 of the user computing device 110 and the microphone component 139 and the audio component 118 of the merchant computing device 130 are activated to simultaneously enable both devices to transmit and listen for audio tokens. In an example, the user computing device 110 receives an merchant audio token from the merchant computing device 130 via the microphone component 119 of the user computing device 110. In this example, in response to receiving the merchant audio token, the user computing device 110 broadcasts the received merchant audio token over multiple available frequencies within multiple available frequency channels to increase the speed at which the merchant computing device 130 may receive the user computing device 110 audio token broadcast by the user computing device 110.

In another example, in response to receiving the merchant audio token, the user computing device 110 activated the audio component 118 of the user computing device 110 every 30 seconds for 10 seconds at a time and, in response to receiving the merchant audio token broadcasted by the merchant computing device 130, increases the interval of the audio component 118 to transmit the audio token every 20 seconds for 10 seconds at a time to increase the speed at which the merchant computing device 130 may receive the user computing device 110 audio token broadcast by the user computing device 110.

In block 580, the user computing device 110 broadcasts a user computing device 110 audio token via the audio component 118 and listens for audio communications via the microphone component 119. In an example, in response to the user 101 selecting the payment application 113 on the user computing device 110 and generating the user computing device 110 transaction identifier, the user computing device 110 generates and broadcasts the user computing device 110 audio token via an audio component 118 and listens for audio tokens via a microphone component 119. In an example, the payment application 113 generates the user computing device 110 audio token. An example user computing device 110 audio token comprises the user computing device 110 transaction identifier and/or a user computing device 110 identifier.

In an example, the payment application 113 activates the audio component 118 of the user computing device 110 to broadcast the user computing device 110 audio token in an environment of the user computing device 110. An example audio component 118 comprises a speaker device that is a component of the user computing device 110 or is otherwise communicatively coupled to the user computing device 110. For example, the payment application 113 transmits an instruction to the audio component 118 to activate the audio component 118 and transmit the user computing device 110 audio token. In an example, the user computing device 110 broadcasts the user computing device 110 audio token via the audio component 118 via an audible sound communication channel. In another example, the user computing device 110 broadcasts the user computing device 110 audio token over an ultrasound communication channel. In an example, the payment application 113 activates the microphone component 119 of the user computing device 110 to listen for audio communications in an environment of the user computing device 110. In an example, in response to receiving an input of the user 101 selecting the payment application 113 on the user computing device 110, the payment application 113 activates the microphone component 119 of the user computing device 110 to listen for audio input in an environment of the user computing device 110. For example, the microphone component 119 listens for merchant audio tokens broadcast by merchant computing devices 130 in a proximity from the user computing device 110 over which communication via audible communication channels or via ultrasound communication channels may reliably occur.

From block 580, the method 250 proceeds to block 260 in FIG. 2.

Returning to FIG. 2, in block 260, the payment processing computing system 140 receives matching audio tokens from the user computing device 110 and the merchant computing device 130. The method for receiving, by a payment processing computing system 140, corresponding transaction information from the user computing device 110 and the merchant computing device 130 is described in more detail hereinafter with reference to the methods 260*a* and 260*b* described in FIGS. 6 and 7, respectively.

Figure 6:
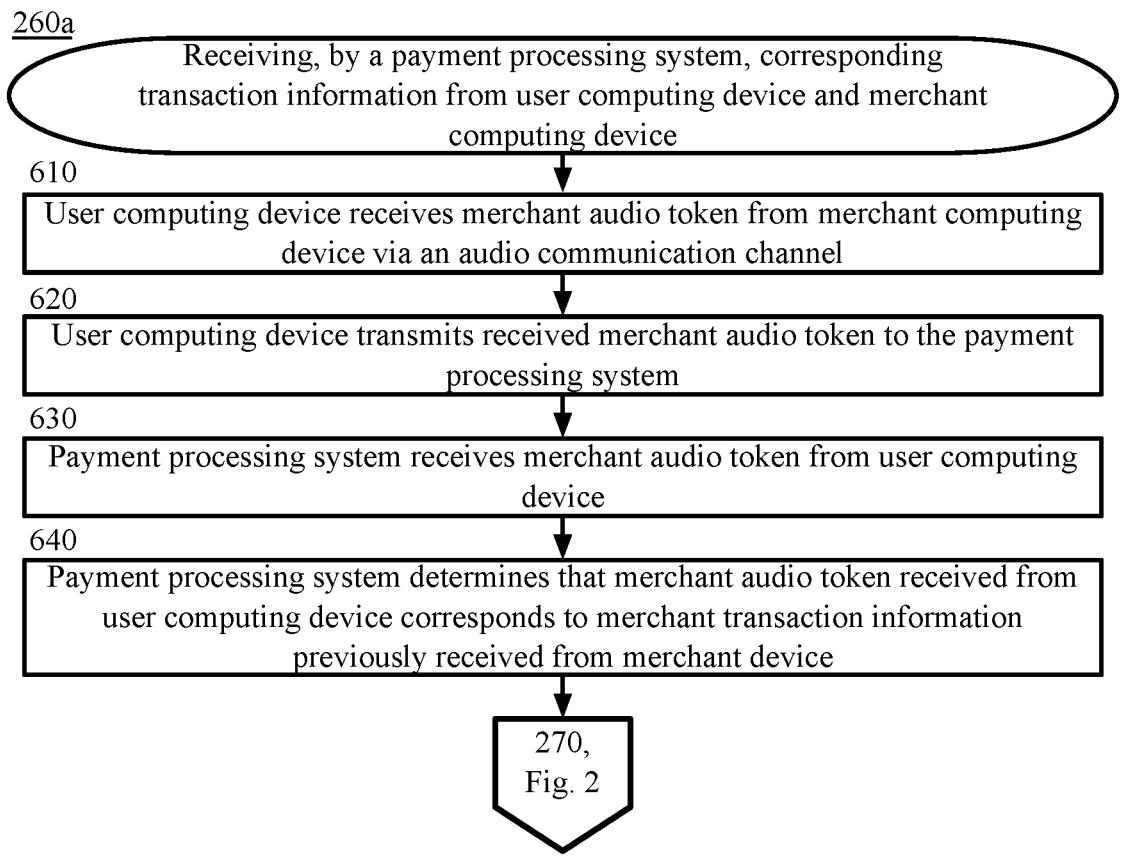
FIG. 6 is a block flow diagram depicting a method for receiving, by a payment processing computing system, corresponding transaction information from a user computing device and a merchant computing device, in accordance with certain examples.

For example, in method 260*a*, illustrated in FIG. 6, the user computing device receives the merchant audio token from the merchant computing device 130 and retransmits the merchant audio token to the payment processing computing system 140. For example, the merchant transaction identifier is transmitted by the merchant computing device 130 to the payment processing computing system via the network 120 and also via an audio token to the user computing device 110, and the user computing device 110 retransmits the received audio token comprising the merchant transaction identifier to the payment processing computing system 140, enabling the payment processing computing system to associate both the user computing device 110 and the merchant computing device 130 with the transaction identified by the merchant transaction identifier.

Figure 7:
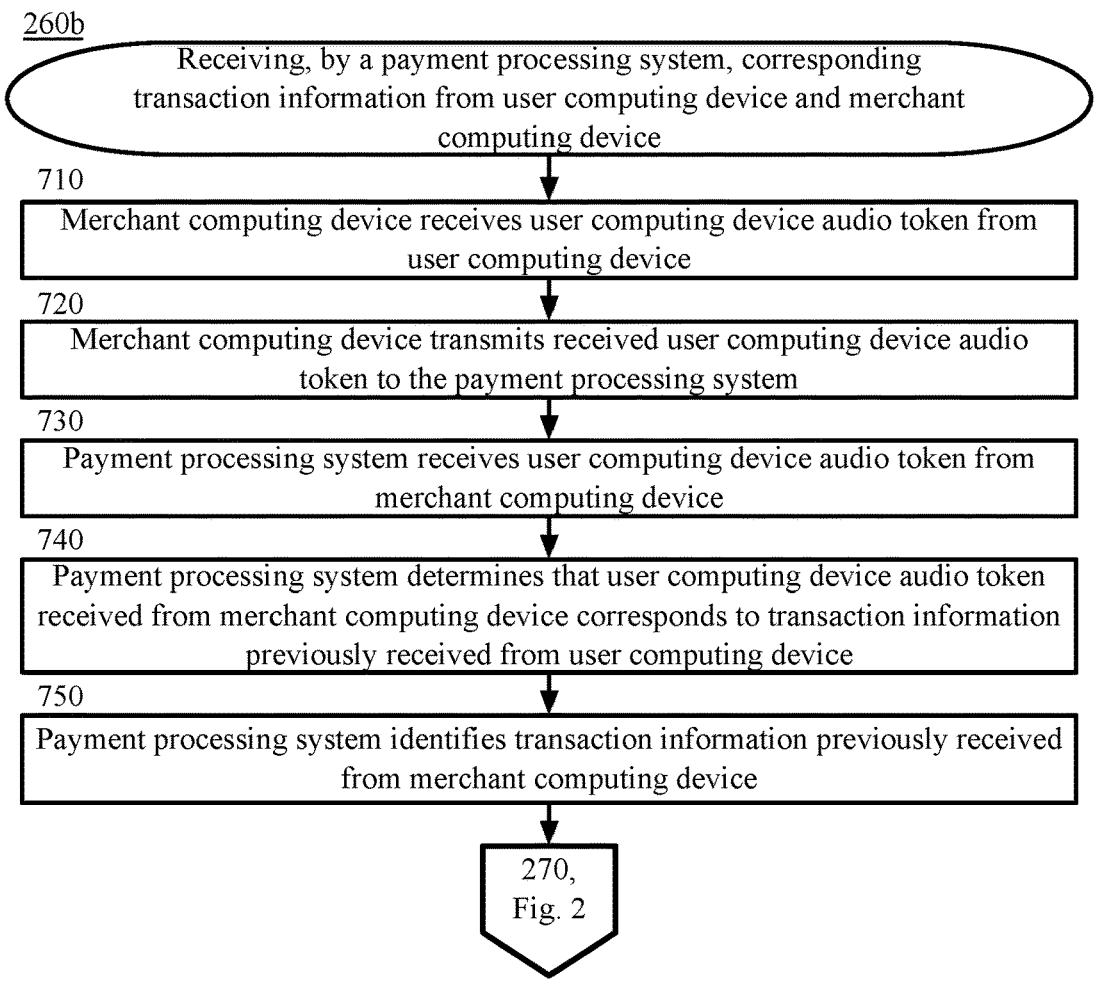
FIG. 7 is a block flow diagram depicting a method for receiving, by a payment processing computing system, corresponding transaction information from a user computing device and a merchant computing device, in accordance with certain examples.

In another example, in method 260*b*, illustrated in FIG. 7, the merchant computing device 130 receives the user computing device 110 audio token from the user computing device 110 and retransmits the user computing device 110 audio token to the payment processing computing system 140. For example, the user computing device 110 transaction identifier is transmitted by the user computing device 110 to the payment processing computing system 140 via the network 120 and also via an audio token to the merchant computing device 130, and the merchant computing device 130 retransmits the audio token comprising the merchant transaction identifier to the payment processing computing system 140, enabling the payment processing computing system to associate both the user computing device 110 and the merchant computing device 130 with the transaction identified by the user computing device 110 transaction identifier.

In certain other examples, the payment processing computing system 140 receives both a user computing device 110 audio token from the merchant computing device 130 and a merchant audio token from the user computing device 110. For example, the payment processing computing system associates the user computing device 110 and the merchant computing device 130 with the transaction identified by the merchant transaction identifier via the example method 260*a* and also associates the user computing device 110 and the merchant computing device 130 with the transaction identified by the user computing device 110 transaction identifier via the example method 260*b*.

FIG. 6 is a block diagram depicting a method 260*a* for receiving, by a payment processing computing system 140, corresponding transaction information from a user computing device 110 and a merchant computing device 130, in accordance with certain examples. For example, method 260*a* describes a process where the payment processing computing system 140 receives, from the user computing device 110, the merchant audio token comprising a merchant transaction identifier previously generated for or received by the payment processing computing system 140 from the merchant computing device 130. The method 260*a* is described with reference to the components illustrated in FIG. 1.

In block 610, the user computing device 110 receives the merchant audio token from the merchant computing device 130 via an audio communication channel. For example, in response to receiving an input of the user 101 selecting the payment application 113 on the user computing device 110, the payment application 113 activates the microphone component 119 of the user computing device 110 to listen for audio input in an environment of the user computing device 110. For example, the microphone component 119 listens for merchant audio tokens broadcast by merchant computing devices 130 in a proximity from the user computing device 110 over which communication via audible communication channels or via ultrasound communication channels may reliably occur. In an example, the merchant computing device 130 broadcasts the merchant audio token via the audio component 138 and the user computing device 110 receives the broadcast merchant audio token over an audio communication channel via the microphone component 119.

In an example, the received merchant audio token comprises a merchant computing device 130 transaction identifier. An example merchant computing device 130 transaction identifier comprises a string of alphanumeric and/or symbolic characters generated by the merchant computing device 130 via a random number generator. In an example, the merchant computing device 130 transmitted the merchant computing device 130 transaction identifier to the payment processing computing system 140 before broadcasting the merchant audio token. In another example, the received merchant audio token comprises a merchant computing device 130 hardware identifier. In this example, the merchant computing device 130 transmitted the merchant computing device 130 hardware identifier to the payment processing computing system 140 before broadcasting the merchant audio token.

In block 620, the user computing device transmits the received merchant audio token to the payment processing computing system 140. For example, the payment application 113 of the user computing device 110 transmits the received merchant audio token to the payment processing computing system 140 via the network 120.

In block 630, the payment processing computing system 140 receives the merchant audio token from the user computing device 110. For example, the payment processing computing system 140 receives the merchant audio token from the user computing device 110 via the network 120.

In block 640, the payment processing computing system 140 determines that the merchant audio token received from the user computing device 110 corresponds to merchant transaction information previously received from the merchant computing device 130. For example, the payment processing computing system 140 determines that a merchant transaction identifier previously received from the merchant computing device 130 and associated with transaction information also received from the merchant computing device 130 corresponds to the merchant transaction identifier in the merchant audio token received from the user computing device 110.

For example, previously, to initiate a transaction, the merchant computing device 130 operator 102 actuated an object on the user interface 131 of the merchant computing device 130 corresponding to the payment application 133 and selected an option to confirm the transaction via the user interface 131. In an example, the merchant computing device 130 generated a merchant transaction identifier via a random number generator comprising a string of alphanumeric and/or symbolic characters. In an example, the merchant computing device 130 transmitted the merchant transaction identifier, merchant transaction details, and a merchant account identifier to the payment processing computing system 140. In an example, the merchant computing device 130 generated merchant transaction details comprising one or more of a total transaction amount, a description of one or more items being purchased in the transaction including prices associated with each of the one or more items, a merchant system identifier, a date and time of the transaction, a location or address associated with the merchant, and other transaction details and transmitted the merchant transaction details to the payment processing computing system 140. In an example, the payment processing computing system 140 associated the received merchant transaction details with the received merchant transaction identifier in a data storage unit 145 accessible to the payment processing computing system 140. In another example, the payment processing computing system 140 associated the received merchant transaction details with a received merchant computing device 130 identifier in a data storage unit 145 accessible to the payment processing computing system 140.

In an example, the merchant audio token received from the user computing device 110 comprises one or more of the merchant transaction identifier and/or the merchant computing device identifier. In an example, the payment processing computing system 140 searches the data storage unit 145 and identifies a stored merchant transaction identifier that matches the merchant transaction identifier in the merchant audio token received by the user computing device 110 and retransmitted to the payment processing computing system 140 via the network 120 to the payment processing computing system 140. In this example, in response to identifying the stored merchant transaction identifier matching the merchant transaction identifier from the merchant audio token, the payment processing computing system 140 extracts the merchant transaction details corresponding to the stored merchant transaction identifier. For example, merchant transaction details comprise one or more of a total transaction amount, a description of one or more items being purchased in the transaction including prices associated with each of the one or more items, a merchant system identifier, a date and time of the transaction, a location or address associated with the merchant, and other transaction details.

In an example, the payment processing computing system 140 associates the merchant transaction details previously received from the merchant computing device 130 with the user computing device 110 identifier and/or user computing device 110 transaction identifier received in the user computing device 110 audio token from the merchant computing device 130 via the network 120. In this example, the payment processing computing system 140 recognizes that the user computing device 110 and the merchant computing device 130 are involved in the same transaction associated with the merchant transaction details and/or user computing device 110 transaction details.

From block 640, the method 260a proceeds to block 270 in FIG. 2.

FIG. 7 is a block diagram depicting a method 260b for receiving, by a payment processing computing system 140, corresponding transaction information from a user computing device 110 and a merchant computing device 130, in accordance with certain examples. For example, method 260b describes a process where the payment processing computing system 140 receives, from the merchant computing device 130, the user computing device 110 audio token comprising a user computing device 110 transaction identifier previously generated for or received by the payment processing computing system 140 from the user computing device 110. The method 260b is described with reference to the components illustrated in FIG. 1.

In block 710, the merchant computing device 130 receives the user computing device 110 audio token from the user computing device 110. For example, in response to receiving an input of the merchant computing device operator 102 selecting the payment application 133 on the merchant computing device 130, the payment application 133 activates the microphone component 139 of the merchant computing device 130 to listen for audio input in an environment of the merchant computing device 130. For example, the microphone component 139 listens for user computing device 110 audio tokens broadcast by user computing devices 110 in a proximity from the merchant computing device 130 over which communication via audible communication channels or via ultrasound communication channels may reliably occur. In an example, the user computing device 110 broadcasts the user computing device 110 audio token via the audio component 118 and the merchant computing device 130 receives the broadcast user computing device 110 audio token over an audio communication channel via the microphone component 139.

In an example, the received user computing device 110 audio token comprises a user computing device 110 transaction identifier. An example user computing device 110 transaction identifier comprises a string of alphanumeric and/or symbolic characters generated by the user computing device 110 via a random number generator. In an example, the user computing device 110 transmitted the user computing device 110 transaction identifier to the payment processing computing system 140 before broadcasting the user computing device 110 audio token. In another example, the received user computing device 110 audio token comprises a user computing device 110 hardware identifier. In this example, the user computing device 110 transmitted the user computing device 110 hardware identifier to the payment processing computing system 140 before broadcasting the user computing device 110 audio token.

In block 720, the merchant computing device 130 transmits the received user computing device 110 audio token to the payment processing computing system 140. For example, the merchant computing device 130 transmits the received user computing device 110 audio token to the payment processing computing system 140 via the network 120.

In block 730, the payment processing computing system 140 receives the user computing device 110 audio token from the merchant computing device 130. For example, the payment processing computing system 140 receives the user computing device 110 audio token from the merchant computing device 130 via the network 120.

In block 740, the payment processing computing system determines that the user computing device 110 audio token received from the merchant computing device 130 corresponds to transaction information previously received from the user computing device 110. For example, the payment processing computing system 140 determines that a user computing device 110 identifier previously received from the user computing device 110 and associated with transaction information also received from the user computing device 110 corresponds to the user computing device 110 transaction identifier in the merchant audio token received from the user computing device 110.

For example, to initiate a transaction, the user 101 of the user computing device 110 actuated an object on the user interface 111 of the user computing device 110 corresponding to the payment application 113 and selected an option to confirm the transaction via the user interface 111. In an example, the user 101 actuated an object on the user interface 111 of the user computing device 110 corresponding to the payment application 113 and actuated an object to confirm the transaction. In an example, in response to receiving an input of the user 101 selecting the user interface 111 object to confirm the transaction, the user computing device 110 generated a user computing device 110 transaction identifier. An example user computing device 110 transaction identifier comprises a string of alphanumeric and/or symbolic characters. In an example, the user computing device 110 generates the user computing device 110 transaction identifier using a random number generator. In an example, the user computing device 110 transmitted the user computing device 110 transaction identifier, user computing device 110 transaction details, and user 101 account identifier to the payment processing computing system 140. In an example, the user computing device 110 generated user computing device 110 transaction details and transmitted the transaction details to the payment processing computing system 140 via the network 120. Example user computing device 110 transaction details may comprise a user computing device 110 account identifier, a date and time of the transaction, a current or recent location logged by the user computing device 110, or other transaction details. In an example, the user computing device 110 account identifier comprises an account identifier associated with a user's 101 payment processing computing system account.

In an example, the user computing device 110 audio token received by the payment processing computing system 140 from the merchant computing device 130 via the network 120 comprises one or more of the user computing device 110 transaction identifier and/or the user computing device 110 identifier. In an example, the payment processing computing system 140 searches the data storage unit 145 and identifies a stored user computing device 110 transaction identifier that matches the user computing device 110 transaction identifier in the user computing device 110 audio token received by the merchant computing device 130 and retransmitted to the payment processing computing system 140 via the network 120. In this example, in response to identifying the stored user computing device 110 transaction identifier matching the user computing device 110 transaction identifier from the user computing device 110 audio token, the payment processing computing system 140 extracts the user computing device 110 transaction details corresponding to the stored user computing device 110 transaction identifier. For example, user computing device 110 transaction details comprise one or more of a user computing device 110 account identifier, a date and time of the transaction, a current or recent location logged by the user computing device 110, or other transaction details. In an example, the user computing device 110 account identifier comprises an account identifier associated with a user payment processing computing system account.

In block 750, the payment processing computing system 140 identifies merchant transaction information previously received from the merchant computing device 130. For example, the payment processing computing system 140 identifies merchant transaction information that was previously received from the merchant computing device 130 within a threshold amount of time, for example, within the last five minutes. For example, to initiate a transaction, the merchant computing device 130 operator 102 actuated an object on the user interface 131 of the merchant computing device 130 corresponding to the payment application 133 and selected an option to confirm the transaction via the user interface 131. In an example, the merchant computing device 130 generated a merchant transaction identifier via a random number generator comprising a string of alphanumeric and/or symbolic characters. In an example, the merchant computing device 130 transmitted the merchant transaction identifier, merchant transaction details, and a merchant account identifier to the payment processing computing system 140. In an example, the merchant computing device 130 generated merchant transaction details comprising one or more of a total transaction amount, a description of one or more items being purchased in the transaction including prices associated with each of the one or more items, a merchant system identifier, a date and time of the transaction, a location or address associated with the merchant, and other transaction details and transmitted the merchant transaction details to the payment processing computing system 140. In an example, the payment processing computing system 140 associated the received merchant transaction details with the received merchant transaction identifier in a data storage unit 145 accessible to the payment processing computing system 140. In another example, the payment processing computing system 140 associated the received merchant transaction details with a received merchant computing device 130 identifier in a data storage unit 145 accessible to the payment processing computing system 140.

In an example, the payment processing computing system 140 associates the identified merchant transaction information previously received from the merchant computing device 130 with the user computing device 110 identifier and/or user computing device 110 transaction identifier received in the user computing device 110 audio token from the merchant computing device 130 via the network 120. In this example, the payment processing computing system 140 recognizes that the user computing device 110 and the merchant computing device 130 are involved in the same transaction associated with the merchant transaction details and/or user computing device 110 transaction details.

In another example, the payment processing computing system 140 does not identify merchant transaction information that was previously received from the merchant computing device 130 within a threshold amount of time and cancels the transaction. In this other example, the payment processing computing system 140 transmits a notice of cancellation of transaction to the merchant computing device 130 and to the user computing device 110 via the network 120.

From block 750, the method 260*b* proceeds to block 270 in FIG. 2.

Returning to FIG. 2, in block 270, the payment processing computing system 140 requests a selection of payment account information from the user computing device 110 and processes a transaction. The method for processing, by a payment processing computing system 140 a payment transaction using user 101 selected payment account data is described in more detail hereinafter with reference to the method described in FIG. 8.

Figure 8:
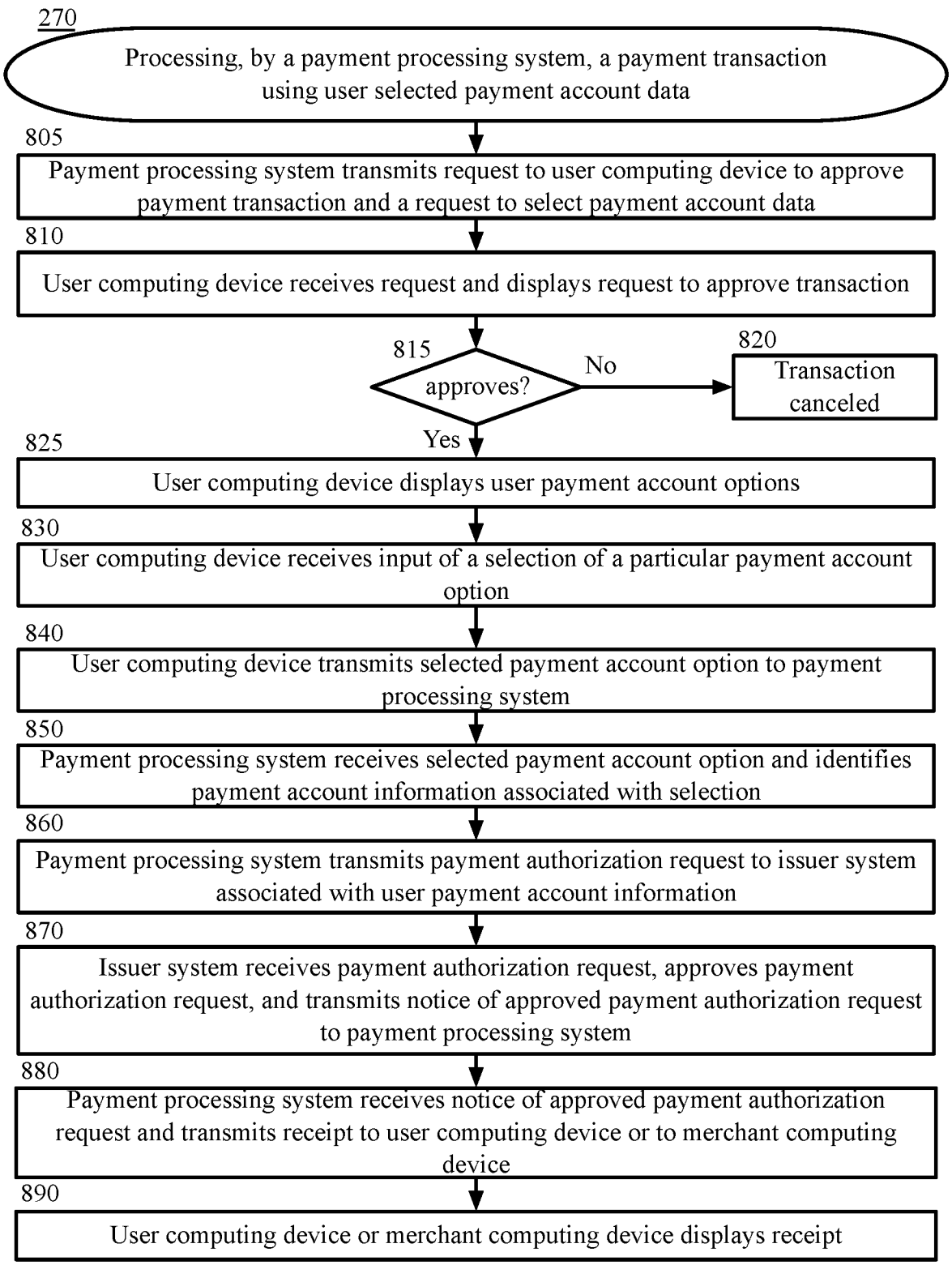
FIG. 8 is a block flow diagram depicting a method for processing, by a payment processing computing system, a payment transaction using user selected payment account data, in accordance with certain examples.

FIG. 8 is a block diagram depicting a method 270 for processing, by a payment processing computing system 140 a payment transaction using user 101 selected payment account data, in accordance with certain examples. The method 270 is described with reference to the components illustrated in FIG. 1.

In certain examples, the payment processing computing system 140 receives audio tokens from one or both of the user computing device 110 and the merchant computing device 130 and identifies merchant transaction information associated with the current transaction.

For example, in method 260*a*, illustrated in FIG. 6, the user computing device receives the merchant audio token from the merchant computing device 130 and retransmits the merchant audio token to the payment processing computing system 140 and the payment processing computing system 140 determines that information received in the merchant audio token corresponds to transaction details previously received from the merchant computing device 130.

In another example, in method 260*b*, illustrated in FIG. 7, the merchant computing device 130 receives the user device audio token from the user computing device 110 and retransmits the user device audio token to the payment processing computing system 140 and the payment processing computing system 140 extracts transaction details previously received from the merchant computing device 130. In certain other examples, the payment processing computing system 140 both a user computing device 110 audio token from the merchant computing device 130 and a merchant audio token from the user computing device 110.

In these examples, the payment processing computing system 140 recognizes, based on information received from the user computing device 110 and the merchant computing device 130, that the user computing device 110 and the merchant computing device 130 are involved in the same transaction associated with the merchant transaction details and/or user computing device 110 transaction details.

In block 805, the payment processing computing system 140 transmits a request to the user computing device 110 to approve a payment transaction and a request to select payment account data. In an example, the payment processing computing system 140 transmits the request to approve the payment transaction and the request to select payment account data to the user computing device 110 via the network 120. In an example, the request to approve the payment transaction comprises a total amount of transaction, a description of one or more items being purchased in the transaction, and/or other relevant transaction information. In an example, merchant transaction previously received by the payment processing computing system 140 over the network 120 comprises the relevant transaction information included in the request to approve the payment transaction. In an example, the request to select payment account data comprises one or more payment account options and instructions to present the one or more payment account options for selection by the user 101 via a user interface 111 of the user computing device 110. For example, a payment account option comprises truncated payment account data, for example, the last four digits of a payment account number.

In an example, the payment processing computing system 140 extracts payment account information corresponding to one or more payment accounts associated with the user 101 account. For example, the user 101 account comprises payment account information associated with one more bank accounts, credit accounts, merchant store accounts, stored value accounts, loyalty program accounts, or other payment accounts. Example payment account information for an example payment account may comprises a payment account number, user 101 address information, a zip code, a card verification value, a user 101 name, or other payment account information necessary to process a payment transaction using the payment account. In an example, the request to select payment account data comprises one or more payment account options associated with a corresponding one or more payment accounts of the user 101 account and instructions to present the one or more payment account options for selection by the user 101 via a user interface 111 of the user computing device 110.

In other examples example, the request to approve the payment transaction includes a request to confirm payment account data instead of a request to select payment account data. In this example, the user 101 pre-configures payment account data with the user 101 account to be used in transactions. For example, the user 101 adds user 101 payment account information to the user 101 payment processing computing system 140 account and configures the user 101 account settings so that the user 101 payment account information is used in transactions. In this example, the request to confirm the payment account data includes truncated payment account information associated with the preconfigured payment account, for example, the last four digits of the preconfigured user 101 payment account. In an example, the payment processing computing system 140 transmits the request to approve the payment transaction and the request to confirm preconfigured payment account data to the user computing device 110 via the network 120.

In block 810, the user computing device 110 receives the request and displays the request to approve the payment transaction. For example, the user computing device 110 receives the request to approve a payment transaction and the request to select payment account data via the network 120. In an example, the user computing device 110 displays the request to approve the payment transaction. In an example, the user computing device 110 displays the total amount of transaction, the description of the one or more items being purchased in the transaction, and/or other relevant transaction information.

In block 815, the user 101 approves or denies the request to approve the payment transaction. In an example, the user computing device 110 displays options to accept or decline the transaction on the user interface 111. In an example, the user 101 reviews the displayed transaction information and either selects one or more user interface 111 objects to approve the transaction or selects one or more user interface 111 objects to decline the transaction.

If the user 101 denies the request to approve the transaction, the method 270 proceeds to block 820. For example, the user computing device 110 receives an input of a selection by the user 101 of one or more user interface 111 objects instructing the user computing device 110 to decline the transaction.

In block 820, the transaction is canceled. For example, in response to receiving the input of the selection by the user 101 of the one or more user interface 111 objects instructing the user computing device 110 to decline the transaction, the user computing device 110 cancels the transaction. For example, canceling the transaction may comprise closing the payment application 113 or returning to a home screen of the payment application 113.

Returning to block 815, if the user approves the payment transaction, the method 270 proceeds to block 825. For example, the user computing device 110 receives an input of a selection by the user 101 of one or more user interface 111 objects instructing the user computing device 110 to accept the transaction.

In block 825, the user computing device 110 displays user 101 payment account options. For example, in response to the user computing device 110 receiving the input of the selection by the user 101 of the one or more user interface 111 objects instructing the user computing device 110 to accept the transaction, the user computing device 110 displays the user 101 payment account options. For example, the request to select payment account data comprises one or more payment account options and instructions to present the one or more payment account options for selection by the user 101 via a user interface 111 of the user computing device 110. For example, a payment account option comprises truncated payment account data, for example, the last four digits of a payment account number. In an example, the user computing device 110 displays one or more user interface 111 objects corresponding to the one or more payment account options available for selection by the user 101 via the user interface 111.

In block 830, the user computing device 110 receives an input of a selection of a particular payment account option. For example, the user 101 reviews the displayed one or more payment account options and selects a particular user interface 111 object corresponding to a particular user 101 payment account.

In block 840, the user computing device 110 transmits the selected payment account option to the payment processing computing system 140. In an example, in response to receiving the input of the selection of the particular payment account option, the user computing device 110 transmits the selected payment account option to the payment processing computing system 140 via the network 120.

In another example, the user computing device 110 first displays the request to select a payment option and then displays the request to approve the payment transaction after receiving a selection of a particular payment option. For example, the user computing device 110 displays a request for the user 101 to select a payment option and displays one or more payment options for selection via the user interface 110. In this example, user 101 selects a particular payment option via the user interface 111 and then, in response to receiving the selection of the particular payment option, the user computing device 110 displays a request to approve the payment transaction. For example, the user computing device 110 displays options to accept or decline the transaction on the user interface 111. In an example, the user 101 reviews the displayed transaction information and either selects one or more user interface 111 objects to approve the transaction or selects one or more user interface 111 objects to decline the transaction. In this example, in response to receiving a selection by the user 101 of the one or more user interface 111 objects instructing the user computing device 110 to approve the transaction, the user computing device 110 transmits the previously selected payment account option to the payment processing computing system 140 via the network 120.

Further, in other examples, the user computing device 110 does not display a request to select a payment account option because the user 101 has preconfigured a particular payment account option for use in transactions and the user computing device 110 may only display the request to approve the transaction with an indication of the preconfigured payment account to be used in the transaction.

In block 850, the payment processing computing system 140 receives the selected payment account option and identifies payment account information associated with the selection. For example, the payment processing computing system 140 receives the selected payment account option over the network 120 from the user computing device 110. For example, the payment processing computing system 140 extracts payment account information associated with the selected payment account from the user 101 account. In another example, the user 101 preconfigured a user 101 payment account for use in transactions and the payment processing computing system 140 extracts payment account information associated with the preconfigured payment account. Example payment account information comprises an account holder name, an account number, a card verification value or code, an address associated with the payment account, a zip code associated with the payment account, or other information necessary to generate a payment authorization request.

In block 860, the payment processing computing system 140 transmits a payment authorization request to the issuer system 150 associated with the user 101 payment account information. In an example, the payment processing computing system generates a payment authorization request based on the extracted payment account information associated with the selected or preconfigured account and based on the merchant transaction information. In an example, the payment processing computing system 140 transmits the payment authorization request to the issuer system 150 associated with the payment account via the network 120. In another example, the payment processing computing system 140 routes the payment authorization request to the issuer system 150 via an acquirer system.

In block 870, the issuer system 150 receives the payment authorization request, approves the payment authorization request, and transmits a notice of approval of the payment authorization request to the payment processing computing system 140. In an example, the issuer system 150 identifies the payment account associated with the authorization request. In an example, the issuer system 150 determines whether to approve or to decline the payment authorization request. In an example, a credit card issuer system 150 determines whether to approve or decline the payment transaction based on the user's 101 current balance, the user's 101 credit limit, and/or the amount of the current transaction. In another example, a coupon issuer system 150 determines whether to approve or decline the payment transaction based on the conditions imposed by a coupon being used in the transaction and transaction data received from the payment processing computing system 140. For example, a credit card issuer system 150 approves the payment transaction because the user 101 credit limit and current credit balance are such that the current transaction amount will not cause the user's 101 credit balance to exceed the credit limit. In another example, a coupon issuer system 150 approves the payment transaction based on the data received from the payment processing computing system 140. In this example, the coupon issuer system 150 determines that the user 101 satisfies the coupon terms and conditions based on the data received from the payment processing computing system 140. In another example, a credit card issuer system 150 declines the payment transaction because the user 101 credit limit and current credit balance are such that the current transaction amount would cause the user's 101 credit balance to exceed the credit limit. In yet another example, a coupon issuer system 150 declines the payment transaction based on the data received from the payment processing computing system 140. In this example, the coupon issuer system 150 determines that the user 101 satisfies the coupon terms and conditions based on the data received from the payment processing computing system 140.

An example notice of authorized payment transaction may comprise a transaction number, a confirmation number, a transaction amount, a portion of the user account number used in the transaction, a time of transaction, and/or any other useful or relevant information to the transaction. In an example, the issuer system 150 generates the notice of approved payment authorization request and transmits the notice of approved payment authorization request via the network 120 to the payment processing computing system 140. In another example, a notice of declined payment authorization request may comprise an error message that indicates that the payment transaction using the payment account was declined. In another example, the issuer system 150 generates the notice of declined payment authorization request and transmits the notice of declined payment authorization request via the network 120 to the payment processing computing system 140.

In block 880, the payment processing computing system 140 receives the notice of approved payment authorization request and transmits a receipt to the user computing device 110 or to the merchant computing device 130. For example, the payment processing computing system 140 receives the notice of approval of the payment authorization request via the network 120. In another example, the payment processing computing system 140 receives a notice of declined payment authorization request via the network 120. In an example, the payment processing computing system 140 forwards the notice of approved payment authorization request or the notice of declined payment authorization request to the user computing device 110 and/or to the merchant computing device 130 via the network. In an example, the user computing device 110 receives the notice of approved payment authorization request or the notice of declined payment authorization request via the network 120 and generates a receipt based on the received approved payment authorization request or the received declined payment authorization request. In another example, the merchant computing device 130 receives the notice of approved payment authorization request or the notice of declined payment authorization request via the network 120 and generates a receipt based on the received approved payment authorization request or the received declined payment authorization request. In another example, the payment processing computing system 140 generates a receipt based on the notice of approved payment authorization request or the notice of declined payment authorization request received from the issuer system 150 and transmits the generated the receipt to the user computing device 110 or to the merchant computing device 130 via the network 120.

In an example, the receipt comprises the transaction total and that the transaction was declined or approved by the issuer system 150. In an example, the transaction receipt comprises a merchant system name, an address of the physical location of the merchant system at which the user 101 made the purchase or attempted to make the purchase, a transaction amount, a portion of the payment account number used in the transaction, the date of the attempted transaction, descriptions and/or prices of one or more items that were purchased or intended to be purchased in the transaction, and/or any other useful or relevant information associated with the approved or declined transaction. In another example, the payment processing computing system 140 transmits an electronic receipt to the user computing device 110 or merchant computing device 130 via email, text messaging, or other appropriate means.

In block 890, the user computing device 110 or the merchant computing device 130 displays the receipt. In another example, the merchant computing device 130 prints a paper transaction receipt via a printer communicatively coupled to the merchant computing device 130.

Other Examples

FIG. 9 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different examples, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system to pair computing devices using audio communication channels, comprising:
a first computing device comprising a first processor communicatively coupled to a first storage device, wherein the first processor executes application code instructions that are stored in the first storage device to cause the first computing device to:
receive a first input requesting to transfer data;
generate a data transfer request comprising a request identifier and the data;
transmit a first computing device identifier and the data transfer request to one or more computing devices;
broadcast a first audio token comprising the first user computing device identifier over two or more audio frequency channels at specified intervals, wherein the first computing device simultaneously broadcasts the first audio token while listening for one or more additional tokens;
activate a first microphone component to listen for audio inputs via the two or more audio frequency channels at the specified intervals;
receive a second audio token from a second computing device via the activated first microphone component; and
communicate the received second audio token to the one or more computing devices, wherein the one or more computing devices transfer the data associated with the data transfer request to the second computing device.

2. The system of claim 1, wherein the specified intervals comprise every 30 seconds for 10 seconds.

3. The system of claim 1, wherein, in response to receiving the second audio token from the second computing device, the first processor executes application code instructions that are stored in the first storage device to cause the first computing device to broadcast the second audio token over multiple available frequencies within multiple available frequency channels.

4. The system of claim 1, wherein, in response to receiving the second audio token from the second computing device, the first processor executes application code instructions that are stored in the first storage device to cause the first computer device to increase the specified interval for listening for audio inputs.

5. The system of claim 1, wherein broadcasting the first audio token over two or more audio frequency channels at specified intervals comprises cycling through the two or more audio frequency channels based on a predetermined audio channel hopping schedule.

6. The system of claim 1, wherein broadcasting the first audio token over two or more audio frequency channels at specified intervals comprises cycling through the two or more audio frequency channels at random.

7. The system of claim 1, further comprising:
the second computing device comprising a second processor communicatively coupled to a second storage device wherein the second processor executes application code instructions that are stored in the second storage device to cause the second computing device to;
receive a second input requesting to receive the data;
broadcast the second audio token comprising the second computing device identifier over at least two audio frequency channels at predetermined intervals;
activate a second microphone component to listen for audio inputs via the at least two audio frequency channels at the predetermined intervals;
receive the first audio token from the first computing device via the activated second microphone component;
communicate the received first audio token to the one or more computing devices; and
receive the data associated with the data transfer request from the one or more computing devices.

8. The system of claim 7, further comprising the one or more computing devices, the one or more computing devices comprising a third processor communicatively coupled to a third storage device, wherein the third processor executes application code instructions that are stored in the third storage device to cause the one or more computing devices to:
identify the first computing device, the second computing device, the data request identifier, and the data transfer request details based on the received first and second audio tokens; and
transfer the data m accordance with the data transfer request to the second computing device.

9. The system of claim 7, wherein, in response to receiving the first audio token from the first computing device, the second processor executes application code instructions that are stored in the second storage device to cause the second computing device to decrease the predefined interval at which the second computing device broadcasts the second audio token.

10. The system of claim 7, wherein, in response to receiving the first audio token from the first computing device, the second processor executes application code instructions that are stored in the second storage device to cause the system to add additional audio frequency channels over which the second computing device broadcasts the second audio token while continuing to broadcast the second audio token via the at least two audio frequency channels.

11. The system of claim 7, wherein, in response to receiving the first audio token from the first computing device, the second processor is further configured to execute application code instructions that are stored in the second storage device to cause the second computing device to deactivate the second microphone component to cease listening for audio tokens.

12. The system of claim 7, wherein at least one of the first audio token and the second audio token is broadcasted via ultrasound.

13. A computer-implemented method to pair computing devices via audio communication channels, comprising:
receiving, by a first computing device, a first requesting to transfer data;
generating, by the first computing device, a request identifier and the data;

transmitting, by the first computing device, a first computing device identifier and the data transfer request to one or more computing devices;
broadcasting, by the first computing device, a first audio token comprising the first user computing device identifier over two or more audio frequency channels at specified intervals;
listening, by the first computing device, for audio inputs via the two or more audio frequency channels at the specified intervals;
receiving, by the first computing device, a second audio token generated by a second computing device;
in response to receiving the second audio token from the second computing device, adding, by the first computing device, additional audio frequency channels over which the first computing device broadcasts the first audio token while continuing to broadcast the first audio token via the at least two audio frequency channels; and
communicating, by the first computing device, the received second audio token to the one or more computing devices, wherein the one or more computing devices transfer the data associated with the data transfer request to the second computing device.

14. The method of claim 13, further comprising:
receiving, by the second computing device, a second input indicating a request to receive the data;
broadcasting, by the second computing device, the second audio token comprising a second computing device identifier over at least two audio frequency channels at predetermined intervals;
listening, by the second computing device, for audio inputs via the at least two audio frequency channels at the predetermined intervals;
receiving, by the second computing device, the first audio token from the first computing device; and
communicating, by the second computing device, the received first audio token to the one or more computing devices.

15. The method of claim 13, further comprising:
receiving, by the second computing device, a second input indicating a request to receive the data;
broadcasting, by the second computing device, the second audio token comprising the second computing device identifier over at least two audio frequency channels at predetermined intervals;
activating, by the second computing device, a second microphone component to listen for audio inputs via the at least two audio frequency channels at the predetermined intervals; and
receiving, by the second computing device, the first audio token from the first computing device via the activated second microphone component.

16. The method of claim 13, further comprising, in response to receiving the second audio token from the second computing device, decreasing, by the first computing device, a predefined interval at which the first computing device broadcasts the first audio token.

17. A computer program product, comprising:
a non-transitory computer-readable medium having computer-executable program instructions embodied thereon that when executed by a first computing device, cause the first computing device to pair to a second computing device via audio communication channels, the computer-executable program instructions comprising:

computer-executable program instructions to receive a first input requesting to receive data;

computer-executable program instructions to broadcast a first audio token comprising a first computing device identifier over at least two audio frequency channels at specified intervals, wherein a second computing device receives the broadcast first audio token and transmits the first audio token to one or more computing devices, and wherein broadcasting the first audio token over at least two audio frequency channels at specified intervals comprises broadcasting the first audio token over the at least two audio frequency channels at one or more predetermined or random intervals;

computer-executable program instructions to activate a first microphone component to listen for audio inputs via the at least two audio frequency channels at the specified intervals;

computer-executable program instructions to receive a second audio token from the second computing device via the activated first microphone component, the second audio token comprising a data request identifier and data request details; and computer-executable program instructions to communicate the received second audio token to the one or more computing devices, wherein the one or more computing devices identify the first computing device, the second computing device, the data request identifier, and the data request details based on the first and second audio tokens received by the one or more computing devices; and computer-executable program instructions to receive the data from the one or more computing devices in accordance with the first input requesting to receive data.

18. The computer program product of claim 17, wherein the specified intervals comprise every 30 seconds for 10 seconds.

19. The computer program product of claim 17, further comprising, in response to receiving the second audio token from the second computing device, adding, by the first computing device, additional audio frequency channels over which the first computing device broadcasts the first audio token while continuing to broadcast the first audio token via the at least two audio frequency channels.

20. The computer program product of claim 17, wherein broadcasting the first audio token over two or more audio frequency channels at specified intervals comprises cycling through the two or more audio frequency channels at random.

* * * * *